United States Patent
Kalt et al.

(10) Patent No.: US 12,514,248 B2
(45) Date of Patent: Jan. 6, 2026

(54) STABLE AQUEOUS SUSPENSION FORMULATIONS

(71) Applicant: BASF SE, Ludwigshafen am Rhein (DE)

(72) Inventors: Markus Kalt, Ludwigshafen (DE); Joachim Bentele, Ludwigshafen (DE); Janine Rude, Ludwigshafen (DE); Doris Kremzow-Graw, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 943 days.

(21) Appl. No.: 17/619,702

(22) PCT Filed: Jun. 18, 2020

(86) PCT No.: PCT/EP2020/066988
§ 371 (c)(1),
(2) Date: Dec. 16, 2021

(87) PCT Pub. No.: WO2020/254505
PCT Pub. Date: Dec. 24, 2020

(65) Prior Publication Data
US 2022/0304301 A1    Sep. 29, 2022

(30) Foreign Application Priority Data

Jun. 19, 2019 (EP) .................................... 19181301

(51) Int. Cl.
*A01N 25/04* (2006.01)
*A01N 25/30* (2006.01)
*A01N 37/50* (2006.01)

(52) U.S. Cl.
CPC ............. *A01N 25/04* (2013.01); *A01N 25/30* (2013.01); *A01N 37/50* (2013.01)

(58) Field of Classification Search
None
See application file for complete search history.

(56) References Cited

U.S. PATENT DOCUMENTS

| | | |
|---|---|---|
| 7,135,437 B2 | 11/2006 | Pallas et al. |
| 2004/0082481 A1 | 4/2004 | Griffiths et al. |
| 2005/0266995 A1 | 12/2005 | Frisch et al. |
| 2014/0336051 A1* | 11/2014 | Schnabel ............... A01N 25/30 504/253 |
| 2015/0087521 A1 | 3/2015 | Allen et al. |
| 2019/0090487 A1* | 3/2019 | Ding .................... A01N 43/653 |
| 2020/0107548 A1 | 4/2020 | Ding et al. |

FOREIGN PATENT DOCUMENTS

| | | | |
|---|---|---|---|
| CN | 104936451 A | | 9/2015 |
| EA | 025875 B1 | | 2/2017 |
| IN | 3308DEL2015 A | * | 2/2017 |
| RU | 2313218 C2 | | 5/2005 |

OTHER PUBLICATIONS

International Search Report and Written Opinion for corresponding PCT/EP2020/066988 mailed Aug. 10, 2020, 8 Pages.
International Search Report for PCT Patent Application No. PCT/EP2020/066992, Issued on Aug. 7, 2020, 4 pages.

* cited by examiner

*Primary Examiner* — H. Sarah Park
(74) *Attorney, Agent, or Firm* — Armstrong Teasdale LLP

(57) ABSTRACT

Described herein is a stable aqueous suspension including dispersed particles of a beneficial effect material such as a pesticide, a relatively high amount of adjuvant and a compatibilizer. Also described herein are a process for preparing the stable aqueous suspension and products of said process.

25 Claims, No Drawings

STABLE AQUEOUS SUSPENSION FORMULATIONS

CROSS-REFERENCE TO RELATED APPLICATIONS

This application is a U.S. National Phase Application of International Patent Application No. PCT/EP2020/066988, filed Jun. 18, 2020, which claims priority to European Patent Application No. 19181301.3, filed Jun. 19, 2019, the entire contents of which are hereby incorporated by reference herein.

The present invention relates to a stable aqueous suspension as defined below comprising dispersed particles of a beneficial effect material such as a pesticide, a relatively high amount of adjuvant and a compatibilizer. The present invention also relates to a process for preparing the stable aqueous suspension and to products of said process.

Aqueous suspension of particulate beneficial effect materials are used for various applications. Often, these suspensions contain adjuvants to either improve the efficacy of the beneficial effect material or to otherwise impart desirable properties to the suspension formulation.

Aqueous pesticide suspension concentrates (SCs) are a well-known type of agrochemical formulation for pesticides which are not, or only sparsely, soluble in water. In aqueous SCs, the pesticide is present in finely divided solid particles which are suspended (dispersed) in a liquid aqueous dispersing medium. For the application in the field, suspension concentrates are usually diluted with water and applied by spraying.

One aspect which is of particular importance for the (pesticidal) efficiency of an agrochemical formulation of a systemic pesticide is the effective uptake of the active ingredient into the plant and/or the pest. For example, uptake is via the leaf is a complex transport process wherein the load of the pesticide must first penetrate the waxy cuticle of the leaf and must subsequently diffuse, via the cuticle, to the actual site of action in the subjacent tissue. Many surfaces of plants (including in particular the leaves) and pests are rather hydrophobic making it difficult to effectively wet such surfaces with aqueous formulations so as to facilitate penetration of the surface by the active ingredient (pesticide) of the formulation.

Contact pesticides depend upon contact between the pesticides and the insect, fungus or scale to be killed. Thorough contact is hard to attain and the effectiveness of contact pesticides depends on factors such as leaf sticking, wetting and spreading properties of the pesticide formulation.

The addition of adjuvants in order to improve the (pesticidal) efficiency of agrochemical formulation is generally known and agricultural practice. Adjuvants include compounds which enhance the efficiency of pesticide formulations by promoting wetting, spreading and/or penetration. Examples of such adjuvants include nonionic compounds which take the form of, e.g. polyalkylene $C_6$-$C_{22}$-alkyl ethers.

Adding adjuvants to agrochemical formulations allows for reducing the amount of active ingredient (pesticide) that is required for achieving the desired level of pesticidal efficiency. A reduction of said amount of pesticide by the use of adjuvants can save costs since pesticides are typically costlier than adjuvants, and additionally can reduce the environmental impact associated with the use of the agrochemical formulation and the associated release of pesticide into the environment.

Using high amounts of adjuvant is therefore desirable to reduce the required amount of pesticide, and benefit from the above-mentioned advantages, as much as possible. However, the inventors found that the amount of adjuvant that can be incorporated into an aqueous pesticide suspension (concentrate) formulation is limited by the stability of the formulation. Specifically, it was observed that high amounts of adjuvant promote aggregation of the pesticide particles in an aqueous suspension formulation, i.e. make the resulting formulation physically instable.

Many pharmaceutical or cosmetic formulations contain dispersed particles such as poorly soluble active agents, pigments, nacreous pigments, or sunscreen pigment. They often contain adjuvants which act as spreading aids and carriers for enhancing the efficacy, deposition or delivery of chemically and physiologically active ingredients and cosmetic materials, and as vehicles for improving the psychosensory, and aesthetic properties of the formulation. It is desirable to provide such formulations which are sufficiently stable over time.

The inventors found that, surprisingly, there is a way to obtain aqueous beneficial effect material suspension formulations which comprise relatively high amounts of adjuvant but are, nevertheless, stable against aggregation. Specifically, they found that such stable aqueous suspensions can be obtained by mixing an aqueous suspension of beneficial effect material with a compatibilizer and then combining the obtained compatibilized beneficial effect material suspension with the adjuvant or by adding an adjuvant to a solution of a compatibilizer and subsequently combining the compatibilized adjuvant with an aqueous beneficial effect material suspension.

Accordingly, the present invention provides a stable aqueous suspension comprising:

(i) dispersed particles of at least one beneficial effect material, wherein the dispersed particles have a particle size distribution characterized by D90 of 50 µm or less, in particular 25 µm or less, more particularly in the range of from 2.5 to 20 µm, even more particularly in the range of from 2.7 to 15 µm, preferably in the range of from 2.85 to 10 µm, preferably in the range of from 3.0 to 10 µm;

(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein
  $R^1$ is $C_8$-$C_{22}$-alkyl or $C_8$-$C_{22}$-alkenyl,
  each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl,
  n is an integer of from 1 to 35, in particular of from 1 to 30, preferably of from 1 to 26, and
  $R^3$ is H or $C_1$-$C_5$-alkyl, preferably H or $C_1$-$C_4$-alkyl,
  and mixtures of such compounds; and (iii) at least one compatibilizer selected from the group consisting of:
  (a) ether compounds of formula $R^4$—O—$(CH_2$—$CH_2$—O$)_m$—H, wherein
    $R^4$ is $C_6$-$C_8$-alkyl,
    m is an integer of from 1 to 15, in particular of from 1 to 12, preferably of from 1 to 10,
    and mixtures of such ether compounds;

(b) sulfated compounds of formula $R^6$—O—($R^5$—O)$_p$—S(O)$_2$—O$^-$ M$^+$, wherein
$R^5$ is independently selected from the group consisting of $C_2$-$C_5$-alkylene radicals, in particular from the group consisting of ethylene, propylene and butylene,
p is an integer of from 0 to 15, preferably of from 0 to 10,
$R^6$ is $C_6$-$C_{14}$-alkyl, and
M$^+$ is an alkali ion or ammonium ion, in particular Na$^+$, and mixtures of such sulfated compounds; and
(c) mixtures of at least one ether compound as defined in (a) and at least one sulfated compound as defined in (b).

In one embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—($R^2$—O)$_n$—$R^3$, wherein
$R^1$ is $C_9$-$C_{22}$-alkyl or $C_9$-$C_{22}$-alkenyl,
each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl,
n is an integer of from 1 to 35, in particular of from 1 to 30, preferably of from 1 to 26, and
$R^3$ is H or $C_1$-$C_5$-alkyl, preferably H or $C_1$-$C_4$-alkyl, and mixtures of such compounds; and
(iii) at least one compatibilizer selected from the group consisting of:
(a) ether compounds of formula $R^4$—O—(CH$_2$—CH$_2$—O)$_m$—H, wherein
$R^4$ is $C_6$-$C_8$-alkyl,
m is an integer of from 1 to 15, in particular of from 1 to 12, preferably of from 1 to 10, and mixtures of such ether compounds;
(b) sulfated compounds of formula $R^6$—O—($R^5$—O)$_p$—S(O)$_2$—O$^-$ M$^+$, wherein
$R^5$ is independently selected from the group consisting of $C_2$-$C_5$-alkylene radicals, in particular from the group consisting of ethylene, propylene and butylene,
p is an integer of from 0 to 15, preferably of from 0 to 10,
$R^6$ is $C_6$-$C_{14}$-alkyl, and
M$^+$ is an alkali ion or ammonium ion, in particular Na$^+$, and mixtures of such sulfated compounds; and
(c) mixtures of at least one ether compound as defined in (a) and at least one sulfated compound as defined in (b).

The stable aqueous suspension preferably comprises:
(i) dispersed particles of at least one beneficial effect material, wherein the dispersed particles have a particle size distribution characterized by D90 of 50 μm or less;
(ii) from 10 to 60% by weight, based on the total weight of the suspension, of at least one adjuvant selected from the group consisting of compounds of formula $R^1$—O—($R^2$—O)$_n$—$R^3$, wherein
$R^1$ is $C_8$-$C_{22}$-alkyl or $C_8$-$C_{22}$-alkenyl,
each $R^2$ is independently selected from the group consisting of $C_2$-$C_5$-alkylene radicals, with the proviso that at least one $R^2$ is other than a $C_2$-alkylene radical when $R^1$ is $C_9$-$C_{15}$-alkyl or $C_9$-$C_{15}$-alkenyl;
n is an integer of from 1 to 35, and
$R^3$ is H or $C_1$-$C_5$-alkyl,
and mixtures of such compounds;
(iii) at least one compatibilizer selected from the group consisting of:
(a) ether compounds of formula $R^4$—O—(CH$_2$—CH$_2$—O)$_m$—H, wherein
$R^4$ is $C_6$-$C_8$-alkyl,
m is an integer of from 1 to 15,
and mixtures of such ether compounds;
(b) sulfated compounds of formula $R^6$—O—($R^5$—O)$_p$—S(O)$_2$—O$^-$ M$^+$, wherein
$R^5$ is independently selected from the group consisting of $C_2$-$C_5$-alkylene radicals,
p is an integer of from 0 to 15,
$R^6$ is $C_6$-$C_{14}$-alkyl, and
M$^+$ is an alkali ion or ammonium ion,
and mixtures of such sulfated compounds; and
(c) mixtures of at least one ether compound as defined in (a) and at least one sulfated compound as defined in (b);
(iv) a preservative; and
(v) an anti-freezing agent.

Preferably, the process for preparing a stable aqueous suspension comprises the steps:
(A)
(1) mixing an aqueous suspension of particles of at least one beneficial effect material with at least one compatibilizer to obtain a compatibilized beneficial effect material suspension; and
(2) combining the compatibilized beneficial effect material suspension with at least one adjuvant to obtain an aqueous suspension; or
(B)
(1) adding to a solution of at least one compatibilizer at least one adjuvant; and
(2) combining the compatibilized adjuvant solution with an aqueous suspension of particles of at least one beneficial effect material to obtain an aqueous suspension;
wherein the at least one compatibilizer is selected from the group consisting of:
(a) ether compounds of formula $R^4$—O—(CH$_2$—CH$_2$—O)$_m$—H, wherein
$R^4$ is $C_6$-$C_8$-alkyl,
m is an integer of from 1 to 15,
and mixtures of such ether compounds;
(b) sulfated compounds of formula $R^6$—O—($R^5$—O)$_p$—S(O)$_2$—O$^-$ M$^+$, wherein
$R^5$ is independently selected from the group consisting of $C_2$-$C_5$-alkylene radicals,
p is an integer of from 0 to 15,
$R^6$ is $C_6$-$C_{14}$alkyl, and
M$^+$ is an alkali ion or ammonium ion,
and mixtures of such sulfated compounds; and (c) mixtures of at least one ether compound as defined in (a) and at least one sulfated compound as defined in (b); and wherein the at least one adjuvant is selected from the group consisting of compounds of formula $R^1$—O—$(R^2$—O$)_n$—$R^3$, wherein
- $R^1$ is $C_8$-$C_{22}$-alkyl or $C_8$-$C_{22}$-alkenyl,
- each $R^2$ is independently selected from the group consisting of $C_2$-$C_5$-alkylene radicals, with the proviso that at least one $R^2$ is other than a $C_2$-alkylene radical when $R^1$ is $C_9$-$C_{15}$-alkyl or $C_9$-$C_{15}$-alkenyl;
- n is an integer of from 1 to 35, and
- $R^3$ is H or $C_1$-$C_5$-alkyl,
- and mixtures of such compounds.

Thus, the present invention also provides a process for preparing a stable aqueous suspension, in particular a stable aqueous suspension of the invention, the process comprising the steps:

(1) mixing an aqueous suspension of particles of at least one beneficial effect material with at least one compatibilizer to obtain a compatibilized beneficial effect material suspension;

(2) combining the compatibilized beneficial effect material suspension with at least one adjuvant to obtain an aqueous beneficial effect material-adjuvant suspension;

wherein the at least one compatibilizer is selected from the group consisting of:

(a) ether compounds of formula $R^4$—O—$(CH_2$—$CH_2$—O$)_m$—H, wherein
- $R^4$ is $C_6$-$C_8$-alkyl,
- m is an integer of from 1 to 15, in particular of from 1 to 12, preferably of from 1 to 10,
- and mixtures of such ether compounds;

(b) sulfated compounds of formula $R^6$—O—$(R^5$—O$)_p$—$S(O)_2$—$O^-$ $M^+$, wherein
- $R^5$ is independently selected from the group consisting of $C_2$-$C_5$-alkylene radicals, in particular from the group consisting of ethylene, propylene and butylene,
- p is an integer of from 0 to 15, preferably of from 0 to 10,
- $R^6$ is $C_6$-$C_{14}$-alkyl, and
- $M^+$ is an alkali ion or ammonium ion, in particular $Na^+$,
- and mixtures of such sulfated compounds; and (c) mixtures of at least one ether compound as defined in (a) and at least one sulfated compound as defined in (b); and wherein the at least one adjuvant is selected from the group consisting of compounds of formula $R^1$—O—$(R^2$—O$)_n$—$R^3$, wherein
- $R^1$ is $C_8$-$C_{22}$-alkyl or $C_8$-$C_{22}$-alkenyl,
- each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl;
- n is an integer of from 1 to 35, in particular of from 1 to 30, preferably of from 1 to 26, and
- $R^3$ is H or $C_1$-$C_5$-alkyl, preferably H or $C_1$-$C_4$-alkyl,
- and mixtures of such compounds.

In one embodiment, the present invention provides a process for preparing a stable aqueous suspension, in particular a stable aqueous suspension of the invention, the process comprising the steps:

(1) mixing an aqueous suspension of particles of at least one beneficial effect material with at least one compatibilizer to obtain a compatibilized beneficial effect material suspension;

(2) combining the compatibilized beneficial effect material suspension with at least one adjuvant to obtain an aqueous beneficial effect material-adjuvant suspension;

wherein the at least one compatibilizer is selected from the group consisting of:

(a) ether compounds of formula $R^4$—O—$(CH_2$—$CH_2$—O$)_m$—H, wherein
- $R^4$ is $C_6$-$C_8$-alkyl,
- m is an integer of from 1 to 15, in particular of from 1 to 12, preferably of from 1 to 10,
- and mixtures of such ether compounds;

(b) sulfated compounds of formula $R^6$—O—$(R^5$—O$)_p$—$S(O)_2$—$O^-$ $M^+$, wherein
- $R^5$ is independently selected from the group consisting of $C_2$-$C_5$-alkylene radicals, in particular from the group consisting of ethylene, propylene and butylene,
- p is an integer of from 0 to 15, preferably of from 0 to 10,
- $R^6$ is $C_6$-$C_{14}$-alkyl, and
- $M^+$ is an alkali ion or ammonium ion, in particular $Na^+$,
- and mixtures of such sulfated compounds; and (c) mixtures of at least one ether compound as defined in (a) and at least one sulfated compound as defined in (b); and wherein the at least one adjuvant is selected from the group consisting of compounds of formula $R^1$—O—$(R^2$—O$)_n$—$R^3$, wherein
- $R^1$ is $C_9$-$C_{22}$-alkyl or $C_9$-$C_{22}$-alkenyl,
- each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl;
- n is an integer of from 1 to 35, in particular of from 1 to 30, preferably of from 1 to 26, and
- $R^3$ is H or $C_1$-$C_5$-alkyl, preferably H or $C_1$-$C_4$-alkyl,
- and mixtures of such compounds.

Preferably, the process for preparing a stable aqueous suspension comprises the steps:

(A)
(1) mixing an aqueous suspension of particles of at least one beneficial effect material with at least one compatibilizer to obtain a compatibilized beneficial effect material suspension; and (2) combining the compatibilized beneficial effect material suspension with at least one adjuvant to obtain an aqueous suspension; or (B)
(1) adding to a solution of at least one compatibilizer at least one adjuvant; and (2) combining the compatibilized adjuvant solution with an aqueous suspension of particles of at least one beneficial effect material to obtain an aqueous suspension;

wherein the at least one compatibilizer is selected from the group consisting of:

(a) ether compounds of formula $R^4$—O—($CH_2$—$CH_2$—O)$_m$—H, wherein
   $R^4$ is $C_6$-$C_8$-alkyl,
   m is an integer of from 1 to 15,
   and mixtures of such ether compounds;
(b) sulfated compounds of formula $R^6$—O—($R^5$—O)$_p$—S(O)$_2$—O$^-$ M$^+$, wherein
   $R^5$ is independently selected from the group consisting of $C_2$-$C_5$-alkylene radicals,
   p is an integer of from 0 to 15,
   $R^6$ is $C_6$-$C_{14}$alkyl, and
   M$^+$ is an alkali ion or ammonium ion,
   and mixtures of such sulfated compounds; and
(c) mixtures of at least one ether compound as defined in (a) and at least one sulfated compound as defined in (b); and wherein the at least one adjuvant is selected from the group consisting of compounds of formula $R^1$—O—($R^2$—O)$_n$—$R^3$, wherein
   $R^1$ is $C_8$-$C_{22}$-alkyl or $C_8$-$C_{22}$-alkenyl,
   each $R^2$ is independently selected from the group consisting of $C_2$-$C_5$-alkylene radicals, with the proviso that at least one $R^2$ is other than a $C_2$-alkylene radical when $R^1$ is $C_9$-$C_{15}$-alkyl or $C_9$-$C_{15}$-alkenyl;
   n is an integer of from 1 to 35, and
   $R^3$ is H or $C_1$-$C_5$-alkyl,
   and mixtures of such compounds;

(3) preferably, combining the aqueous suspension aqueous suspension of step (2) with a preservative and an anti-freezing agent.

In the context of the present invention, the terms used generically are defined as follows:

The prefix $C_x$-$C_y$ denotes the number of possible carbon atoms in the particular case.

The term "alkyl" refers to saturated straight, branched or cyclic hydrocarbon radicals having the indicated number of carbon atoms. Examples of alkyl radicals include, e.g., methyl, ethyl, propyl, 1-methylethyl (isopropyl), butyl, 1-methylpropyl (sec-butyl), 2-methylpropyl (isobutyl), 1,1-dimethylethyl (tert-butyl), pentyl, 1-methylbutyl, 2-methylbutyl, 3-methylbutyl, 2,2-dimethylpropyl, 1-ethylpropyl, cyclopentyl, hexyl, 1-methylpentyl, n-heptyl, n-octyl, 2-ethylhexyl, n-nonyl, n-decyl, 1-methylnonyl, 2-propylheptyl, n-dodecyl, 1-methyldodecyl, n-tridecyl, n-tetradecyl, n-pentadecyl, n-hexadecyl, n-heptadecyl, n-octadecyl, n-nonadecyl, n-eicosyl.

The term "alkenyl" as used herein denotes in each case an unsaturated hydrocarbon radical having the indicated number of carbon atoms and at least one, preferably one, two or three, double bonds. Examples of alkenyl radicals include, e.g., non-3-enyl, dec-4-enyl, 1-methylnon-3-enyl, 2-propylhept-3-enyl, dodec-2-enyl, 1-methyldodec-3-enyl, tridec-6-enyl, tetradec-4-enyl, pentade-2-encyl, hexadec-6-enyl, heptadec-8-enyl, octadec-2enyl, nonadec-3-enyl, cis-9-octadecenyl.

The term "alkylene" refers to saturated, divalent straight or branched hydrocarbon radicals having the indicated number of carbon atoms. Examples of alkylene radicals include, e.g., ethane-1,2-diyl, propane-1,3-diyl, propane-1,2-diyl, 2-methylpropane-1,2-diyl, butane-1,4-diyl, butane-1,3-diyl (=1-methylpropane-1,3-diyl), butane-1,2-diyl and butane-2,3-diyl.

Polymeric groups of two or more alkylene oxide (e.g., ethylene oxide (EO), propylene oxide (PO), butylene oxide (BO)) radicals, such as the group termed "($R^2$—O)$_n$" herein, mean that alkylene oxides have been reacted so as to form repeating units of (alkyl-O).

The term "ammonium ion" as used herein includes unsubstituted ammonium ions (NH$_4^+$) and substituted (primary, secondary, tertiary and quaternary) ammonium ions wherein one, two, three or all four of the hydrogen atoms of NH$_4^+$ is substituted by alkyl groups, in particular $C_1$-$C_4$-alkyl groups. Examples of ammonium ions include, e.g., NH$_4^+$, CH$_3$NH$_3^+$, (CH$_3$)$_2$NH$_2^+$, (CH$_3$)$_3$NH$^+$, (CH$_3$)$_4$N$^+$, C$_2$H$_5$NH$_3^+$, (C$_2$H$_5$)$_2$NH$_2^+$, (C$_2$H$_5$)$_3$NH$^+$, (C$_2$H$_5$)$_4$N$^+$ and C$_3$H$_7$NH$_3^+$.

The beneficial effect material used in the suspensions and processes of the invention are, at 25° C., solid compounds which are not, or only sparsely, soluble in water. Specifically, said beneficial effect materials generally have a solubility in water at 25° C. of 5000 mg/l or less, in particular of 1000 mg/l or less, more particularly of 500 mg/l or less, even more particularly of 200 mg/l or less, preferably of 100 mg/l or less, especially of 50 mg/l or less.

In the stable aqueous suspensions of the invention, most of the beneficial effect material is thus present in the form of dispersed (solid) particles. Particles can be characterized in terms of their size distribution using so-called D values. D values, such as D10, D50 and D90 recited herein, are intercepts for the given percentage (i.e. 10% for D10, 50% for D50, 90% for D90) of the cumulative mass in a particle size distribution. Thus, a D90 of "x" μm means that 90% of the total weight of the particles is comprised by particles having a size (i.e. a diameter) of "x" μm or less, and the remaining 10% are particles having a size of more than "x" μm. Likewise, a D50 of "x" μm means that 50% of the total weight of the particles is comprised by particles having a size (i.e. a diameter) of "x" μm or less, and the remaining 50% are particles having a size of more than "x" μm. Likewise, a D10 of "x" μm means that 10% of the total weight of the particles is comprised by particles having a size (i.e. a diameter) of "x" μm or less, and the remaining 90% are particles having a size of more than "x" μm.

The dispersed beneficial effect material particles in the stable aqueous suspensions of the invention are characterized by a D90 value of 25 μm or less, in particular the D90 value of said beneficial effect material particles is in the range of from 2.5 to 20 μm, more particularly in the range of from 2.7 to 15 μm, preferably in the range of from 2.85 to 10 μm, preferably in the range of from 3.0 to 10 μm.

The size distribution of beneficial effect material particles can be determined by conventional methods such as laser diffraction according to the Fraunhofer model, for example using a Malvern Mastersizer 3000 instrument (see, e.g., method (1) in the "Examples" section).

The beneficial effect material is a material that provides a beneficial effect, typically a biological effect or desirable aesthetic effect when deposited on a substrate such as a plant locus, vegetable matter, skin or hair.

The beneficial effect material may be selected from agrochemically active agents such as pesticides, pharmaceutically active agents, and cosmetic agents.

Pesticides are substances for controlling pests, including microbial pests, weeds and animal pests. The term "pesticides" as used herein is meant to refer, in particular, to substances for controlling pests which are detrimental in (agricultural or horticultural) plant production, more particularly to substances which are for protecting plants from pests such as, e.g., weeds, fungi or insects. Pesticides include, but are not limited to, fungicides, bactericides, herbicides, nematicides, molluscicides, insecticides (including insect growth regulators) and pest repellents (including repellents for insects or molluscs).

According to particular embodiments, the pesticides used in the suspensions and processes of the invention are fungicides, in particular strobilurin fungicides or mixtures thereof. Strobilurin fungicides (also termed "strobilurins") are a well-known group of chemical compounds which are used, particularly in agriculture, to control parasitic fungi, and/or their spores. Strobilurins belong to the group of quinone outside ($Q_O$) inhibitors (also termed $Q_OI$) which inhibit the respiratory chain at the level of Complex III. Particular strobilurin fungicides which can be used in the suspensions and processes of the invention include azoxystrobin, fluoxastrobin, trifloxystrobin, kresoxim methyl, picoxystrobin, and mixtures thereof.

fluoxastrobin kresoxim methyl trifloxystrobin picoxystrobin azoxystrobin

In another embodiment the pesticide is a herbicide, preferably a triazine, preferably a triazinone. A triazinone which can be used in the suspensions and processes of the invention is for instance mercaptotriazinone.

Expediently, the skilled person will choose the amount of pesticide to be used in the suspensions and processes of the present invention depending on the desired pesticidal activity of the product (i.e. the pesticide-adjuvant suspension). As explained above, the use of higher amounts of adjuvant will usually allow for reducing the amount of pesticide that is required to achieve the desired pesticidal activity. Typical amounts of pesticide used in the suspensions and processes of the present invention are in the range of from 5 to 30% by weight, in particular in the range of from 10 to 20% by weight, based on the total weight of the pesticide-adjuvant suspension.

In an embodiment, the pesticide particles in the aqueous suspensions of the invention consist of the (essentially pure) pesticide(s), i.e. the at least one pesticide makes up at least 90% by weight, in particular at least 95% by weight, more particularly at least 97% by weight, of the total weight of the beneficial effect materials (i.e., the pesticide particles).

Generally, pharmaceutically active agents useful in the invention are active pharmaceutical agents that can be delivered transdermally. Examples of such drugs include, but are not limited to, raloxifene, alendronate, and naltrexone.

One type of cosmetic agents useful in the invention are pigments. These materials usually provide for an optical effect including absorbing, reflecting, transmitting, diffusing and/or refracting any portion of the light spectrum, and especially of the UV and visible wavelengths. The pigments are selected from the wide variety of colored inorganic pigments, organic pigments or composite pigments commonly used in the cosmetic field. Among cosmetic products, mention can be made of: lipsticks, lip glosses, nail enamels, mascaras, cheek blushes, eye shadows and hair sprays, without limitation.

There may be mentioned as examples of inorganic pigments carbon black, iron oxides, chromium oxide, chromium hydrate, ultramarines (aluminosilicate polysulfides), cobalt blue, Prussian blue (ferric ferrocyanide), manganese violet, manganese pyrophosphate and some metal powders, such as silver or aluminum powders. Organic pigments may be chosen among nitroso, nitro, azo, xanthene, quinoline, anthraquinone, phthalocyanin, metal-complex, isoindolinone, isoindoline, quinacridone, perinone, perylene, diketopyrrolopyrrole, thioindigo, dioxazine, triphenylmethane, and quinophthalone compounds. The composite pigments include in particular lacquers, that is to say salts of certain metals (calcium, barium, aluminum, strontium, zirconium and mixtures thereof) of organic acid dyes, immobilized on an organic support such as rosin, or on an inorganic support such as alumina, barium sulfate, calcium carbonate, talc, clay, zinc oxide, titanium dioxide and combinations thereof. There may be mentioned as examples of such lacquers, the calcium salt of lithol red B on rosin and barium sulfate (D & C Red No. 7 calcium lake), the aluminum salt of tartrazine on alumina (FD & C Yellow #5 aluminum lake), the aluminum salt eosin on alumina and titanium dioxide (D & C Red No. 21 aluminum lake), aluminum salt Phloxine B on alumina (D & C Red No. 27 aluminum lake), the aluminum salt of polished alumina yellow FCF (FD & C yellow No. 6 aluminum lake) and the aluminum salt of brilliant blue on alumina (FD & C blue #1 aluminum lake).

Nacreous pigments are based on mica flakes coated with metal oxides.

Useful sunscreen pigments may be selected from titanium dioxide and zinc oxide.

Unless indicated otherwise, the percentages of beneficial effect materials, adjuvants, compatibilizers and other components of the aqueous suspension indicated herein are weight percentages based on the total weight of the suspension.

The aqueous suspensions of the present invention comprise an amount of from 10 to 60% by weight, based on the total weight of the suspension, of at least one adjuvant.

As used herein, the term "adjuvant" refers to a compound that has by itself no, or only a negligible, activity of the kind exerted by the beneficial effect material and improves the performance (in particular biological performance such as the pesticidal efficiency) of the beneficial effect material on the target (e.g. the pest) or otherwise imparts desirable properties to the suspension.

Adjuvants useful in connection with pesticides include compounds which exhibit a pesticide activity-enhancing activity by acting as penetration enhancers, spreading and/or wetting agents, or combinations thereof. Adjuvants which are penetration enhancers increase the amount of pesticide that penetrates into a plant or a pest and/or or increases the time required for a given amount of pesticide to penetrate into the plant or the pest. Adjuvants which are spreading and/or wetting agents promote the deposition and/or spreading of the pesticide on the, typically hydrophobic, surfaces of plants and pests.

Adjuvants useful in pharmaceutical or cosmetic preparations may act as spreading aids and carriers for enhancing the efficacy, deposition or delivery of chemically and physiologically active ingredients and cosmetic materials, and as vehicles for improving the psychosensory, and aesthetic properties of the formulation.

The adjuvants used in the suspensions and processes of the present invention are selected from the group consisting of compounds of formula $R^1-O-(R^2-O)_n-R^3$, wherein
  $R^1$ is $C_8$-$C_{22}$-alkyl or $C_8$-$C_{22}$-alkenyl,
  each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl;
  n is an integer of from 1 to 35, in particular of from 1 to 30, preferably of from 1 to 26, and
  $R^3$ is H or $C_1$-$C_5$-alkyl, preferably H or $C_1$-$C_4$-alkyl,
and mixtures of such compounds.

Such adjuvants are well known in the art and commercially available.

Preferably, the adjuvant comprises a hydrophilic-lipophilic-balance (HLB, based on the method of Davies) between −2 and 6.

According to one group of embodiments, the at least one adjuvant is selected from the group consisting of compounds of formula $R^1-O-(R^2-O)_n-R^3$, wherein
  $R^1$ is $C_9$-$C_{22}$-alkyl, in particular straight or branched $C_9$-$C_{15}$-alkyl, more particularly branched $C_9$-$C_{15}$-alkyl;
  each $R^2$ is independently selected from the group consisting of $C_2$-$C_5$-alkylene radicals, in particular from the group consisting of ethylene, propylene and butylene, with the proviso that at least one $R^2$ is other than a $C_2$-alkylene radical, in particular a propylene or butylene, in particular, when $R^1$ is $C_9$-$C_{15}$-alkyl or $C_9$-$C_{15}$-alkenyl;
  n is an integer of from 1 to 25, preferably 2 to 25, and
  $R^3$ is H,
and mixtures of such compounds.

According to one group of embodiments, the at least one adjuvant is selected from the group consisting of compounds of formula $R^1-O-(R^2-O)_n-R^3$, wherein
  $R^1$ is $C_8$-$C_{18}$-alkyl or $C_8$-$C_{18}$-alkenyl;
  each $R^2$ is independently selected from the group consisting of $C_2$-$C_4$-alkylene radicals, in particular from the group consisting of ethylene, propylene and butylene, with the proviso that at least one $R^2$ is other than a $C_2$-alkylene radical when $R^1$ is $C_9$-$C_{15}$-alkyl or $C_9$-$C_{15}$-alkenyl;
  n is an integer of from 6-20, and
  $R^3$ is H or $C_1$-$C_4$-alkyl,
and mixtures of such compounds.

According to a preferred group of embodiments, the at least one adjuvant is selected from the group consisting of compounds of formula $R^1-O-(R^2-O)_n-R^3$, wherein
  $R^1$ is $C_{15}$-$C_{19}$-alkyl or $C_{15}$-$C_{19}$-alkenyl,
  each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
  n is an integer of from 16 to 20, preferably $(R^2-O)_n$ is a polymeric group of 2-6 ethylene oxide radicals and 12-16 propylene oxide radicals, and
  $R^3$ is H or butyl;
and mixtures of such compounds.

According to more preferred group of embodiments, the at least one adjuvant is selected from the group consisting of compounds of formula $R^1-O-(R^2-O)_n-R^3$, wherein
  $R^1$ is straight $C_{16}$-$C_{18}$-alkyl or straight $C_{16}$-$C_{18}$-alkenyl,
  each $R^2$ is independently selected from the group consisting of $C_2$ or $-C_3-$ alkylene radicals, with the proviso that at least one $R^2$ is other than a $C_2$-alkylene radical when $R^1$ is $C_9$-$C_{15}$-alkyl or $C_9$-$C_{15}$-alkenyl;
  n is an integer of from 16 to 20, preferably $(R^2-O)_n$ is a polymeric group of 2-6 ethylene oxide radicals and 12-16 propylene oxide radicals, and
  $R^3$ is H;
and mixtures of such compounds.

According to a preferred group of embodiments, the at least one adjuvant is selected from the group consisting of compounds of formula $R^1-O-(R^2-O)_n-R^3$, wherein
  $R^1$ is straight or branched, preferably, branched, $C_1$-$C_9$-alkyl or $C_1$-$C_9$-alkenyl,
  each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
  n is an integer of from 13 to 15, preferably $(R^2-O)_n$ is a polymeric group of 2-8 ethylene oxide radicals and 7-10 propylene oxide radicals, and
  $R^3$ is H;
and mixtures of such compounds.

According to a preferred group of embodiments, the at least one adjuvant is selected from the group consisting of compounds of formula $R^1-O-(R^2-O)_n-R^3$, wherein
  $R^1$ is branched $C_1$-$C_9$-alkyl or $C_1$-$C_9$-alkenyl,
  each $R^2$ is independently selected from the group consisting of $C_2$ or $-C_3-$ alkylene radicals, with the proviso that at least one $R^2$ is other than a $C_2$-alkylene radical when $R^1$ is $C_9$-$C_{15}$-alkyl or $C_9$-$C_{15}$-alkenyl;

n is an integer of from 13 to 15, preferably $(R^2—O)_n$ is a polymeric group of 2-8 ethylene oxide radicals and 7-10 propylene oxide radicals, and
$R^3$ is H;
and mixtures of such compounds.

According to a more specific subgroup of embodiments, the at least one adjuvant is selected from the group consisting of compounds of formula $R^1—O—(R^2—O)_n—R^3$, wherein
$R^1$ is straight or branched $C_9$-$C_{15}$-alkyl, in particular branched $C_9$-$C_{15}$-alkyl;
$(R^2—O)_n$ is a polymeric group of 1-10 ethylene oxide radicals and 1-5 butylene oxide radicals; and
$R^3$ is H,
and mixtures of such compounds.

According to another more specific subgroup of embodiments, the at least one adjuvant is selected from the group consisting of compounds of formula $R^1—O—(R^2—O)_n—R^3$, wherein
$R^1$ is branched $C_9$-$C_{15}$-alkyl;
$(R^2—O)_n$ is a polymeric group of 1-10 ethylene oxide radicals and 1-10 propylene oxide radicals; and
$R^3$ is H,
and mixtures of such compounds.

According to another group of embodiments, the at least one adjuvant is selected from the group consisting of compounds of formula $R^1—O—(R^2—O)_n—R^3$, wherein
$R^1$ is straight or branched $C_{16}$-$C_{22}$-alkenyl, in particular straight or branched $C_{16}$-$C_{18}$-alkenyl, more particularly straight $C_{16}$-$C_{18}$-alkenyl;
each $R^2$ is independently selected from the group consisting of $C_2$-$C_5$-alkylene radicals, in particular from the group consisting of ethylene, propylene and butylene;
n is an integer of from 2 to 25, and
$R^3$ is $C_1$-$C_5$-alkyl, in particular $C_1$-$C_4$-alkyl,
and mixtures of such compounds.

According to a more specific subgroup of the aforementioned group of embodiments,
$R^1$ is straight $C_{16}$-$C_{18}$-alkenyl;
$(R^2—O)_n$ is a polymeric group of 1-25 ethylene oxide radicals; and
$R^3$ is selected from $C_1$-$C_4$-alkyl.

The aqueous suspensions of the invention comprise, and the processes of the invention use, at least one compatibilizer. The amount of said at least one compatibilizer is typically in the range of from 2.5 to 12% by weight, in particular in the range of from 4.0 to 10.0% by weight, preferably from 5.0 to 10.0%, based on the total weight of the aqueous suspension.

Preferably, the compatibilizer comprises a hydrophilic-lipophilic-balance (HLB, based on the method of Davies) between 4 and 50, preferably between 4-10 or 30-42.

The at least one compatibilizer is selected from the group consisting of:
(a) ether compounds of formula $R^4—O—(CH_2—CH_2—O)_m—H$, wherein
$R^4$ is $C_6$-$C_8$-alkyl,
m is an integer of from 1 to 15,
and mixtures of such ether compounds;
(b) sulfated compounds of formula $R^6—O—(R^5—O)_p—S(O)_2—O^-\,M^+$, wherein
$R^5$ is independently selected from the group consisting of $C_2$-$C_5$-alkylene radicals,
p is an integer of from 0 to 15,
$R^6$ is $C_6$-$C_{14}$-alkyl, preferably, $C_8$-, $C_{12}$-, or $C_{14}$-alkyl, and
$M^+$ is an alkali ion or ammonium ion,
and mixtures of such sulfated compounds; and
(c) mixtures of at least one ether compound as defined in (a) and at least one sulfated compound as defined in (b).

Preferably, the at least one compatibilizer can be selected from the group consisting of:
(a) ether compounds of formula $R^4—O—(CH_2—CH_2—O)_m—H$, wherein
$R^4$ is $C_6$-$C_8$-alkyl,
m is an integer of from 4-10,
and mixtures of such ether compounds;
(b) sulfated compounds of formula $R^6—O—(R^5—O)_p—S(O)_2—O^-\,M^+$, wherein
$R^5$ is independently selected from the group consisting of $C_2$-$C_5$-alkylene radicals,
p is an integer of from 0 to 5,
$R^6$ is $C_8$-$C_{14}$-alkyl, and
$M^+$ is an alkali ion or ammonium ion,
and mixtures of such sulfated compound; and
(c) mixtures of at least one ether compound as defined in (a) and at least one sulfate compound as defined in (b).

In particular, the at least one compatibilizer can be selected from the group consisting of:
(a) ether compounds of formula $R^4—O—(CH_2—CH_2—O)_m—H$, wherein
$R^4$ is $C_6$-$C_7$-alkyl, and
m is an integer of from 1 to 10,
and mixtures of such ether compounds;
(b) sulfated compounds of formula $R^6—O—(R^5—O)_p—S(O)_2—O^-\,M^+$, wherein
$R^5$ is independently selected from the group consisting of ethylene, propylene and butylene,
p is an integer of from 0 to 10,
$R^6$ is straight or branched $C_1$-$C_9$-alkyl, and
$M^+$ is an alkali ion or ammonium ion, in particular $Na^+$, $K^+$ or $NH_4^+$, more particularly $Na^+$,
and mixtures of such sulfated compounds; and
(c) mixtures of at least one ether compound as defined in (a) and at least one sulfate compound as defined in (b).

Preferably, the at least one compatibilizer is selected from the group consisting of:
(a) $C_6H_{13}—O—(CH_2—CH_2—O)_5—H$,
(b) sodium 2-ethyl hexyl sulfate or ammonium 2-ethyl hexyl sulfate, and
(c) mixtures of (a) and (b).

Preferably, the at least one compatibilizer is selected from the group consisting of:
sulfated compounds of formula $R^6—O—(R^5—O)_p—S(O)_2—O^-\,M^+$, wherein
$R^5$ is independently selected from the group consisting of ethylene, propylene and butylene,
p is an integer of from 0 to 4,
$R^6$ is straight $C_1$-$C_{15}$-alkyl, and
$M^+$ is an alkali ion or ammonium ion,
and mixtures of such sulfated compounds.

Preferably, the at least one compatibilizer is selected from the group consisting of:
sulfated compounds of formula $R^6—O—(R^5—O)_p—S(O)_2—O^-\,M^+$, wherein
$R^5$ is ethylene,
p is an integer of from 1 to 3,
$R^6$ is straight $C_{12}$- or $C_{14}$-alkyl, and
$M^+$ is an alkali ion or ammonium ion,
and mixtures of such sulfated compounds.

In another preferred embodiment, the at least one compatibilizer is selected from the group consisting of:
sulfated compounds of formula $R^6—O—(R^5—O)_p—S(O)_2—O^-\,M^+$, wherein p is 0, R$^6$ is straight C$_8$-C$_{12}$-alkyl, preferably C$_8$- or C$_{12}$-alkyl, and M$^+$ is an alkali ion or ammonium ion, and mixtures of such sulfated compounds.

The aqueous suspensions of the invention typically comprise at least 20% by weight of water, based on the total weight of the suspension.

Typically, the sum of the least one beneficial effect material, the at least one adjuvant, the at least one compatibilizer and the water comprised in the aqueous suspensions of the invention makes up at least 85% by weight, in particular 90% by weight, preferably 95% by weight, of the total weight of the aqueous suspension.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula R$^1$—O—(R$^2$—O)$_n$—R$^3$, wherein R$^1$ is straight or branched C$_9$-C$_{15}$-alkyl, in particular branched C$_9$-C$_{15}$-alkyl;

(R$^2$—O)$_n$ is a polymeric group of 1-10 ethylene oxide radicals and 1-5 butylene oxide radicals; and R$^3$ is H, and mixtures of such compounds; and (iii) at least one compatibilizer selected from the group consisting of:

ether compounds of formula R$^4$—O—(CH$_2$—CH$_2$—O)$_m$—H, wherein

R$^4$ is C$_6$-C$_7$-alkyl, and m is an integer of from 1 to 10.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula R$^1$—O—(R$^2$—O)$_n$—R$^3$, wherein R$^1$ is straight or branched C$_9$-C$_{15}$-alkyl, in particular branched C$_9$-C$_{15}$-alkyl;

(R$^2$—O)$_n$ is a polymeric group of 1-10 ethylene oxide radicals and 1-5 butylene oxide radicals; and R$^3$ is H, and mixtures of such compounds; and (iii) at least one compatibilizer selected from the group consisting of:

sulfated compounds of formula R$^6$—O—(R$^5$—O)$_p$—S(O)$_2$—O$^-$ M$^+$, wherein R$^5$ is independently selected from the group consisting of ethylene, propylene and butylene, p is an integer of from 0 to 10, R$^6$ is branched C$_1$-C$_9$-alkyl, and M$^+$ is an alkali ion or ammonium ion, in particular Na$^+$, K$^+$ or NH$_4^+$, more particularly Na$^+$, and mixtures of such sulfated compounds.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula R$^1$—O—(R$^2$—O)$_n$—R$^3$, wherein R$^1$ is branched C$_9$-C$_{15}$-alkyl;

(R$^2$—O)$_n$ is a polymeric group of 1-10 ethylene oxide radicals and 1-10 propylene oxide radicals; and R$^3$ is H, and mixtures of such compounds; and (iii) at least one compatibilizer selected from the group consisting of:

sulfated compounds of formula R$^6$—O—(R$^5$—O)$_p$—S(O)$_2$—O$^-$ M$^+$, wherein R$^5$ is independently selected from the group consisting of ethylene, propylene and butylene, p is an integer of from 0 to 10, R$^6$ is straight or branched C$_1$-C$_9$-alkyl, and M$^+$ is an alkali ion or ammonium ion, in particular Na$^+$, K$^+$ or NH$_4^+$, more particularly Na$^+$, and mixtures of such sulfated compounds.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula R$^1$—O—(R$^2$—O)$_n$—R$^3$, wherein R$^1$ is branched C$_9$-C$_{15}$-alkyl;

(R$^2$—O)$_n$ is a polymeric group of 1-10 ethylene oxide radicals and 1-10 propylene oxide radicals; and R$^3$ is H, and mixtures of such compounds; and (iii) at least one compatibilizer selected from the group consisting of:

sulfated compounds of formula R$^6$—O—(R$^5$—O)$_p$—S(O)$_2$—O$^-$ M$^+$, wherein R$^5$ is independently selected from the group consisting of ethylene, propylene and butylene, p is an integer of from 0 to 10, R$^6$ is branched C$_1$-C$_9$-alkyl, and M$^+$ is an alkali ion or ammonium ion, in particular Na$^+$, K$^+$ or NH$_4^+$, more particularly Na$^+$, and mixtures of such sulfated compounds.

In another embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein
$R^1$ is branched $C_9$-$C_{15}$-alkyl;
$(R^2$—O$)_n$ is a polymeric group of 1-10 ethylene oxide radicals and 1-10 propylene oxide radicals; and
$R^3$ is H,
and mixtures of such compounds; and
(iii) at least one compatibilizer selected from the group consisting of:
ether compounds of formula $R^4$—O—$(CH_2$—$CH_2$—O$)_m$—H, wherein
$R^4$ is $C_6$-$C_7$-alkyl, and
m is an integer of from 1 to 10.

In another embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein
$R^1$ is branched $C_9$-$C_{15}$-alkyl;
$(R^2$—O$)_n$ is a polymeric group of 1-10 ethylene oxide radicals and 1-10 propylene oxide radicals; and
$R^3$ is H,
and mixtures of such compounds; and
(iii) at least one compatibilizer selected from the group consisting of:
sulfated compounds of formula $R^6$—O—$(R^5$—O$)_p$—S$(O)_2$—$O^-$ $M^+$, wherein
$R^5$ is ethylene,
p is an integer of from 1 to 3,
$R^6$ is straight $C_{12}$- or $C_{14}$-alkyl, and
$M^+$ is an alkali ion or ammonium ion,
and mixtures of such sulfated compounds.

In another embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein
$R^1$ is straight $C_{16}$-$C_{18}$-alkenyl;
$(R^2$—O$)_n$ is a polymeric group of 1-25 ethylene oxide radicals; and
$R^3$ is selected from $C_1$-$C_4$-alkyl;
and mixtures of such compounds; and
(iii) at least one compatibilizer selected from the group consisting of:
sulfated compounds of formula $R^6$—O—$(R^5$—O$)_p$—S$(O)_2$—$O^-$ $M^+$, wherein
$R^5$ is independently selected from the group consisting of ethylene, propylene and butylene,
p is an integer of from 0 to 10,
$R^6$ is straight or branched $C_1$-$C_9$-alkyl, and
$M^+$ is an alkali ion or ammonium ion, in particular $Na^+$, $K^+$ or $NH_4^+$, more particularly $Na^+$,
and mixtures of such sulfated compounds.

In another embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein
$R^1$ is straight $C_{16}$-$C_{18}$-alkenyl;
$(R^2$—O$)_n$ is a polymeric group of 1-25 ethylene oxide radicals; and
$R^3$ is selected from $C_1$-$C_4$-alkyl;
and mixtures of such compounds; and
(iii) at least one compatibilizer selected from the group consisting of:
sulfated compounds of formula $R^6$—O—$(R^5$—O$)_p$—S$(O)_2$—$O^-$ $M^+$, wherein
$R^5$ is independently selected from the group consisting of ethylene, propylene and butylene,
p is an integer of from 0 to 10,
$R^6$ is branched $C_1$-$C_9$-alkyl, and
$M^+$ is an alkali ion or ammonium ion, in particular $Na^+$, $K^+$ or $NH_4^+$, more particularly $Na^+$,
and mixtures of such sulfated compounds.

In another embodiment, the present invention provides a stable aqueous suspension comprising:
(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;
(ii) from 10 to 60% by weight, in particular from 15 to 50% by weight, based on the total weight of the suspension, of at least one adjuvant selected from the group consisting of compounds of formula $R^1$—O—$(R^2$—O$)_n$—$R^3$, wherein $R^1$ is straight $C_{16}$-$C_{18}$-alkenyl;
($R^2$—O)$_n$ is a polymeric group of 1-25 ethylene oxide radicals; and
$R^3$ is selected from $C_1$-$C_4$-alkyl;
and mixtures of such compounds; and (iii) at least one compatibilizer selected from the group consisting of:
ether compounds of formula $R^4$—O—(CH$_2$—CH$_2$—O)$_m$—H, wherein
$R^4$ is $C_6$-$C_7$-alkyl, and
m is an integer of from 1 to 10.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula $R^1$—O—($R^2$—O)$_n$—$R^3$, wherein
$R^1$ is $C_{15}$-$C_{19}$-alkyl or $C_{15}$-$C_{19}$-alkenyl,
each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
n is an integer of from 16 to 20, preferably ($R^2$—O)$_n$ is a polymeric group of 2-6 ethylene oxide radicals and 12-16 propylene oxide radicals, and
$R^3$ is H;
and mixtures of such compounds; and (iii) at least one compatibilizer selected from the group consisting of:
sulfated compounds of formula $R^6$—O—($R^5$—O)$_p$—S(O)$_2$—O$^-$ M$^+$, wherein
$R^5$ is ethylene,
p is an integer of from 1 to 3,
$R^6$ is straight $C_{12}$- or $C_{14}$-alkyl, and
M$^+$ is an alkali ion or ammonium ion,
and mixtures of such sulfated compounds.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula $R^1$—O—($R^2$—O)$_n$—$R^3$, wherein
$R^1$ is $C_{15}$-$C_{19}$-alkyl or $C_{15}$-$C_{19}$-alkenyl,
each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
n is an integer of from 16 to 20, preferably ($R^2$—O)$_n$ is a polymeric group of 2-6 ethylene oxide radicals and 12-16 propylene oxide radicals, and
$R^3$ is H;
and mixtures of such compounds; and (iii) at least one compatibilizer selected from the group consisting of:
sulfated compounds of formula $R^6$—O—($R^5$—O)$_p$—S(O)$_2$—O$^-$ M$^+$, wherein
$R^5$ is independently selected from the group consisting of ethylene, propylene and butylene,
p is an integer of from 0 to 10,
$R^6$ is straight $C_1$-$C_9$-alkyl, and
M$^+$ is an alkali ion or ammonium ion, in particular Na$^+$, K$^+$ or NH$_4^+$, more particularly Na$^+$,
and mixtures of such sulfated compounds.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula $R^1$—O—($R^2$—O)$_n$—$R^3$, wherein
$R^1$ is $C_{15}$-$C_{19}$-alkyl or $C_{15}$-$C_{19}$-alkenyl,
each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
n is an integer of from 16 to 20, preferably ($R^2$—O)$_n$ is a polymeric group of 2-6 ethylene oxide radicals and 12-16 propylene oxide radicals, and
$R^3$ is H;
and mixtures of such compounds; and (iii) at least one compatibilizer selected from the group consisting of:
sulfated compounds of formula $R^6$—O—($R^5$—O)$_p$—S(O)$_2$—O$^-$ M$^+$, wherein
p is 0,
$R^6$ is straight $C_8$-$C_{12}$-alkyl, preferably $C_8$- or $C_{12}$-alkyl, and
M$^+$ is an alkali ion or ammonium ion,
and mixtures of such sulfated compounds.

In another embodiment, the present invention provides a stable aqueous suspension comprising:

(i) dispersed particles of at least one beneficial effect material, wherein the dispersed particles have a particle size distribution characterized by D90 of 50 μm or less, in particular 25 μm or less, more particularly in the range of from 2.5 to 20 μm, even more particularly in the range of from 2.7 to 15 μm, preferably in the range of from 2.85 to 10 μm, preferably in the range of from 3.0 to 10 μm;

(ii) from 10 to 60% by weight, in particular from 15 to 50% by weight, based on the total weight of the suspension, of at least one adjuvant selected from the group consisting of compounds of formula $R^1$—O—($R^2$—O)$_n$—$R^3$, wherein
$R^1$ is straight or branched, preferably branched, $C_1$-$C_9$-alkyl or $C_1$-$C_9$-alkenyl, each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;

n is an integer of from 13 to 15, preferably $(R^2$—$O)_n$ is a polymeric group of 2-8 ethylene oxide radicals and 7-10 propylene oxide radicals, and $R^3$ is H;

and mixtures of such compounds; and (iii) at least one compatibilizer selected from the group consisting of:

sulfated compounds of formula $R^6$—O—$(R^5$—O$)_p$—S$(O)_2$—O$^-$ M$^+$, wherein $R^5$ is ethylene, p is an integer of from 1 to 3, $R^6$ is straight $C_{12}$- or $C_{14}$-alkyl, and M$^+$ is an alkali ion or ammonium ion, and mixtures of such sulfated compounds.

Preferably, the aqueous suspension of the present invention comprising a beneficial effect material, an adjuvant, and a compatibilizer, in particular in combinations as described in the table below, also comprise an anti-freezing agent and a preservative as described herein.

Preferred adjuvants are described in the following table (Table A):

| Adjuvant according to the formula $R^1$—O—$(R^2$—O$)_n$-$R^3$, wherein | | | | | |
|---|---|---|---|---|---|
| Identifier | R1 | R2-a | n-a | R2-b | n-b | R3 |
| 1 | $C_{13}/C_{15}$ branched | EO | 9 | BuO | 2 | H |
| 2 | Mix of adjuvant 3 & 4 | | | | | |
| 3 | $C_{13}/C_{15}$ branched | EO | 6 | PO | 3 | H |
| 4 | $C_{13}/C_{15}$ branched | EO | 2 | PO | 5 | H |
| 5 | Oleyl (C18 unsaturated) | EO | 20 | | | Bu |
| 6 | $C_{16}/C_{18}$ linear | EO | 4 | PO | 13 | H |
| 7 | 2-Ethylhexyl (C8 branched) | PO | 8 | EO | 6 | H |

Preferred compatibilizers are described in the following table (Table B):

| Compatibilizer according to the formula $R^4$—O—$(CH_2$—$CH_2$—O$)_m$—H, wherein | | |
|---|---|---|
| Identifier | R4 | m |
| a | C6 linear | 5 |

| Compatibilizer according to the formula $R^6$—O—$(R^5$—O$)_p$—SO$_3^-$ M$^+$, wherein | | | |
|---|---|---|---|
| Identifier | R6 | R5 | p | M |
| b | 2-Ethylhexyl (C8 branched) | | 0 | Na |
| c | $C_{12}/C_{14}$ linear | Et | 1 | Na |
| d | $C_{12}/C_{14}$ linear | Et | 2 | Na |
| e | $C_{12}/C_{14}$ linear | Et | 3 | Na |
| f | C8 linear | | 0 | Na |
| g | C12 linear | | 0 | Na |

In the aqueous suspension of the present invention the following combinations of of types of adjuvants and compatibilizer according to the tables above are particularly preferred.

| adjuvant | compatibilizer |
|---|---|
| 1 | a |
| 1 | b |
| 2 | a |
| 2 | b |
| 2 | d |
| 2 | c |
| 2 | e |
| 5 | a |
| 5 | b |
| 6 | c |
| 6 | d |
| 6 | g |
| 6 | f |
| 7 | c |

The aqueous suspensions of the invention can further include auxiliaries. Such auxiliaries may include, e.g., dispersants, anti-foaming agents, viscosity-modifying additives (thickeners), crystallization inhibitors, preservatives (e.g., bactericides), colorants and/or anti-freezing agents. Said dispersants are such which, during the preparation of the particles of beneficial effect material through milling, reduce or prevent agglomeration of the particles and improve milling efficiency.

According to one group of embodiments, the aqueous suspensions of the invention further comprise at least one dispersant, at least one anti-foaming agent and at least one thickener, preferably, the aqueous suspension comprises a dispersant.

Dispersants are generally used to maintain solids or liquids in dispersion. The dispersant used herein is preferably different to the adjuvant and to the compatibilizer of the present invention. Preferably, the dispersant is anionic or nonionic. Preferably, the dispersant has a molecular weight above 2000, preferably in the range of 2000 to 30,000.

Anionic dispersants usually bear at least one anionic group, which is selected from phosphate, phosphonate, sulfate and sulfonate groups, polycarboxylate, maleic acid/olefin copolymer Na salt, or Na salt of modified polyacrylic acid. The anionic dispersant, which bear at least one anionic group, are typically used in the form of their alkali metal salts, especially of their alkali metal, alkaline earth metal, or ammonium salts, preferably of their sodium salts or in the form of their ammonium salts.

Examples of anionic dispersants, which bear at least one sulfate or sulfonate group, are, for example, the salts, especially the alkali metal, alkaline earth metal, or ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, the salts, especially the alkali metal, alkaline earth metal, or and ammonium salts, of sulfuric monoesters of ethoxylated alkylphenols, especially of sulfuric monoesters of ethoxylated $C_4$-$C_{18}$-alkylphenols (EO level preferably 3 to 40), the salts, especially the alkali metal, alkaline earth metal, or and ammonium salts, of alkylsulfonic acids, especially of $C_8$-$C_{22}$-alkylsulfonic acids, the salts, especially the alkali metal, alkaline earth metal, or and ammonium salts, of mono- or disulfonated, alkyl-substituted diphenyl ethers, for example of bis(phenylsulfonic acid) ethers bearing a $C_4$-$C_{24}$-alkyl group on one or both aromatic rings, and the salts, especially the alkali metal, alkaline earth metal, or and ammonium salts, of tristyryl phenol alkoxylates, for example TSP-16 sulfate, i.e., ethoxylated tristyrylphenol, POE (polyoxyethylene) 16.

Examples of anionic dispersants, which bear a phosphate or phosphonate group, include, but are not limited to the following salts are selected from the following groups:
- the salts, especially the alkali metal, alkaline earth metal, or and ammonium salts, of mono- and dialkyl phosphates, especially $C_8$-$C_{22}$-alkyl phosphates,
- the salts, especially the alkali metal, alkaline earth metal, or and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20,
- the salts, especially the alkali metal, alkaline earth metal, or and ammonium salts, of phosphoric monoesters of ethoxylated alkylphenols, especially phosphoric monoesters of ethoxylated $C_4$-$C_{18}$-alkylphenols (EO level preferably 3 to 40),
- the salts, especially the alkali metal, alkaline earth metal, or and ammonium salts, of alkylphosphonic acids, especially $C_8$-$C_{22}$-alkylphosphonic acids,
- the salts, especially the alkali metal, alkaline earth metal, or and ammonium salts, of alkylbenzenephosphonic acids, especially $C_4$-$C_{22}$-alkylbenzenephosphonic acids, and
- the salts, especially the alkali metal, alkaline earth metal, or and ammonium salts, of tristyryl phenol alkoxylates, for example TSP-16 phosphate, i.e., ethoxylated tristyrylphenol, POE (polyoxyethylene) 16.

Suitable dispersants may also be nonionic dispersants. Suitable nonionic dispersants are e.g. araliphatic or aliphatic nonionic dispersants, for example
- ethoxylated mono-, di- and trialkylphenols (EO level: 3 to 50, alkyl radical: $C_4$-$C_{10}$),
- ethoxylates of long-chain alcohols (EO level: 3 to 100, alkyl radical: $C_8$-$C_{36}$), and
- polyethylene oxide/polypropylene oxide homo- and copolymers, optional alkylated with $C_4$ carbon chain, preferably alkyloxy-started polyethylene oxide/polypropylene oxide homo- and copolymers such as butoxy-started; these may comprise the alkylene oxide units copolymerized in random distribution or in the form of blocks.

Furthermore, of course, copolymerizable dispersants might be used as well. Such copolymerizable dispersants usually have an ethylenically unsaturated moiety and thus are polymerizable and/or copolymerizable with the other monomers under the conditions of an aqueous radical emulsion polymerization.

Examples for suitable dispersants which can be used in the aqueous suspensions of the invention include, e.g., alkali metal, alkaline earth metal and ammonium salts which are aryl- and $C_1$-$C_{16}$-alkylarylsulfonates such as naphthylsulfonate, mono-, di- and tri-$C_1$-$C_{16}$-alkylnaphthylsulfonates such as dibutylnaphtylsulfonate, dodecyldiphenylether sulfonate, mono-, di- and tri-$C_1$-$C_{16}$-alkylphenylsulfonates such as cumylsulfonate, octylbenzene sulfonate, nonylbenzenesulfonate, dodecylbenzene sulfonate and tridecylbenzene sulfonate. Further examples of suitable dispersants include copolymers of $C_2$-$C_5$-alkylene oxides, e.g., ethylene oxide/propylene oxide block copolymers, and $C_2$-$C_5$-alkoxylates of $C_8$-$C_{18}$-fatty alcohols, e.g., $C_8$-$C_{18}$-fatty alcohol ethoxylates; typically those copolymers and fatty acid alkoxylates having a number average molecular weight in the range of from 100 to 20,000, preferably from 500 to 10,000. Further examples of suitable dispersants include polymeric anionic surfactants having sulfonate groups bound to an aromatic moiety such as an optionally alkyl substituted phenyl or an optionally alkyl substituted naphthyl ring, e.g. condensates of arylsulfonic acid with formaldehyde and optionally in addition with urea, such as naphthalene or alkyl naphthalene sulfonic acid formaldehyde condensates, phenol sulfonic acid formaldehyde condensates, cresol sulfonic acid formaldehyde condensates, ligninsulfonates, etc., and the salts thereof. Additional examples of suitable dispersants include maleic acid/olefin copolymers (preferably Na salt), modified polycarboxylates (preferably Na salt), polymer based modified alkylene glycols, or modified polyacrylic acid (preferably Na salt). Further examples of suitable dispersants include copolymers of methyl methacrylate, methacrylic acid, both grafted with methoxy PEG (polyethylene glycol) methacrylate, or polyhydroxystearic acid/polyethylene oxide block polymer (ABA type), or butyl-PO/EO block, or phosphate ester of branched decanol.

Preferred is a dispersant selected from the group consisting of a maleic acid polymer with diisobutene (preferably sodium salt), an alkylnaphthalene sulfonate condensate (preferably Na salt), a block copolymer, central with polypropylene glycol, flanked with two polyethylene glycol groups, a copolymer based on vinyl acetate, preferably, copolymer based on vinyl acetate with alcohol-EO, and a phosphate ester of an ethoxylated isodecanol.

Most preferred is a dispersant selected from the group consisting of an alkylnaphthalene sulfonate condensate (preferably sodium salt), a block copolymer, central with polypropylene glycol, flanked with two polyethylene glycol groups, and a copolymer based on vinyl acetate, preferably, copolymer based on vinyl acetate with alcohol-EO.

The amount of the at least one dispersant in the aqueous suspensions of the invention is generally in the range of from 0.01 to 10% by weight, preferably in the range of from 0.1 to 5% by weight, based on the total weight of the aqueous suspension.

Preferably, the aqueous suspension of the present invention comprising a beneficial effect material, an adjuvant, a compatibilizer, and a dispersant, in particular in combinations as described in the table below, also comprise an anti-freezing agent and a preservative as described herein.

In the aqueous suspension of the present invention the following combinations of of types of adjuvant, compatibilizer, and dispersant are particularly preferred.

| adjuvant | compatibilizer | dispersant |
| --- | --- | --- |
| 1 | a | block copolymer, central with polypropylene glycol, flanked with two polyethylene glycol groups |
| 1 | b | block copolymer, central with polypropylene glycol, flanked with two polyethylene glycol groups |

| adjuvant | compatibilizer | dispersant |
|---|---|---|
| 2 | a | block copolymer, central with polypropylene glycol, flanked with two polyethylene glycol groups |
| 2 | b | block copolymer, central with polypropylene glycol, flanked with two polyethylene glycol groups |
| 2 | a | alkylnaphthalene sulfonate condensate |
| 2 | b | alkylnaphthalene sulfonate condensate |
| 2 | d | alkylnaphthalene sulfonate condensate |
| 2 | c | alkylnaphthalene sulfonate condensate |
| 2 | e | alkylnaphthalene sulfonate condensate |
| 2 | d | copolymer based on vinyl acetate with alcohol-EO |
| 2 | c | copolymer based on vinyl acetate with alcohol-EO |
| 2 | e | copolymer based on vinyl acetate with alcohol-EO |
| 5 | a | block copolymer, central with polypropylene glycol, flanked with two polyethylene glycol groups |
| 5 | b | block copolymer, central with polypropylene glycol, flanked with two polyethylene glycol groups |
| 5 | b | alkylnaphthalene sulfonate condensate |
| 6 | c | copolymer based on vinyl acetate with alcohol-EO |
| 6 | d | copolymer based on vinyl acetate with alcohol-EO |
| 6 | g | copolymer based on vinyl acetate with alcohol-EO |
| 6 | f | copolymer based on vinyl acetate with alcohol-EO |
| 7 | c | copolymer based on vinyl acetate with alcohol-EO |

Thickeners are compounds which impart a modified flowability to formulations, in particular increased viscosity under static conditions and reduced viscosity during agitation. The property of a liquid to exhibit reduced viscosity during agitation (shearing) is called shear thinning. Thickeners may assist in stabilizing suspensions against caking. Examples for suitable thickeners which can be used in the aqueous suspensions of the invention include, e.g., polysaccharides and organic and anorganic clays such as such as methylcellulose, carboxymethylcellulose, hydroxypropylcellulose (Klucel® grades), xanthan gum (commercially available e.g. as Kelzan® grades from Kelco or Rhodopol® grades from Rhodia), synthetic polymers such as acrylic acid polymers (Carbopol® grades), polyvinyl alcohol (e.g. Mowiol® and Poval® grades from Kuraray), polyvinyl pyrrolones, silicic acid or phyllosilicates such as montmorillonite and bentonites, which may be hydrophobized (commercially available as Attaclay® grades and Attaflow® grades from BASF SE; or as Veegum® grades and Van Gel® grades from R. T. Vanderbilt). In the context of the present invention, xanthan gum is a preferred thickener. The amount of the at least one thickener in the aqueous suspensions of the invention will generally not exceed 3% by weight, based on the total weight of the suspension, and is preferably in the range of from 0.001 to 3% by weight, in particular from 0.002 to 2% by weight and especially from 0.003 to 1% by weight, based on the total weight of the suspension.

Examples for suitable anti-freezing agents which can be used in the aqueous suspensions of the invention include, e.g., ethylene glycol, propylene glycol, urea and glycerin. Preferably, the anti-freezing agent is propylene glycol.

Preferably, the anti-freeze is incorporated in the adjuvant-compatibilizer mixture before adding it to the milled aqueous beneficial effect material, preferably pesticide, suspension concentrate.

Examples for suitable anti-foaming agents which can be used in the aqueous suspensions of the invention include, e.g., silicone emulsions (such as, for example, Silicone SRE-PFL from Wacker, SAG antifoam compounds from Momentive or Rhodorsil® from Rhodia), long-chain alcohols, fatty acids, organofluorine compounds and mixtures thereof.

Examples for suitable preservatives which can be used to prevent microbial spoiling of the aqueous suspensions of the invention include, e.g., formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. Preferably, the preservative is a thiazolinone or a thiazolinone derivative.

Preferably, the anti-freeze is incorporated in the adjuvant-compatibilizer mixture before adding it to the milled aqueous beneficial effect material, preferably pesticide, suspension concentrate.

Preferably, the aqueous suspension comprises a preservative and an anti-freezing agent as described herein. Most preferably, the aqueous suspension comprises as anti-freeze propylene glycol and as preservative a thiazolinone.

Commercially available preservatives that are based on isothiazolinones are for example marketed under the trademarks Proxel® (Arch Chemical), Acticide® MBS (Thor Chemie) and Kathon® MK (Rohm & Haas). Examples for suitable bactericides are those based on dichlorophene and benzylalcohol hemi formal (Proxel® from ICI or Acticide® RS from Thor Chemie and Kathon® MK from Rohm & Haas).

Examples for suitable colorants which can be used in the aqueous suspensions of the invention include, e.g., rhodamin B, C. I. pigment red 112, C. I. solvent red 1, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108.

If appropriate, the aqueous suspensions of the invention may comprise buffers to regulate the pH. Examples of buffers are alkali metal salts of weak inorganic or organic acids such as, for example, phosphoric acid, boric acid, acetic acid, propionic acid, citric acid, fumaric acid, tartaric acid, oxalic acid and succinic acid.

If the at least one beneficial effect material used in the aqueous suspensions and processes of the invention includes a compound having a solubility in water at 25° C. of more than 200 mg/l, it can be advantageous to further include at least one crystallization inhibitor. The at least one crystallization inhibitor is usually present in the aqueous suspension that is used in step (1) of the process of the invention. The amount of the at least one crystallization inhibitor is expediently chosen such as to prevent the growth of beneficial effect material crystals in the aqueous suspension.

Such crystal growth would result in an undesired increase in the size of the beneficial effect material particles in the suspension.

Suitable crystallization inhibitors can be selected from, e.g., ethylene oxide/propylene oxide block copolymers, ethylene oxide/butylene oxide block copolymers, and mixtures thereof, and in particular from ethylene oxide/propylene oxide block copolymers. Said copolymers typically have a number average molecular weight in the range of from 100 to 20,000, preferably from 500 to 10,000. Further suitable crystallization inhibitors can be selected from acrylic acid homopolymers, typically those having a number average molecular weight in the range of from 500 to 500,000, in particular from 750 to 250,000, preferably from 1,000 to 100,000. Further suitable crystallization inhibitors can be selected from copolymers of acrylic acid and maleic acid as well as copolymers of maleic acid and $C_3$-$C_{10}$ alkene, wherein said copolymers typically have a number average molecular weight in the range of from 500 to 200,000, preferably from 1,000 to 100,000. Typically, such crystallization inhibitors are used in amounts in the range of from 0.001 to 2.5% by weight, based on the total weight of the aqueous suspension.

Preferably, the aqueous suspension comprises propylene glycol (PG). The addition of propylene glycol to the solution of compatibilizer in water facilitated the workability of the compatibilizer.

Preferably, the propylene glycol is added to an aqueous solution of the compatibilizer.

In a further preferred embodiment wherein the beneficial effect material of the aqueous suspension is selected from the class of strobilurine and the aqueous suspension comprises propylene glycol.

Preferably, the aqueous suspension of the present invention comprising a beneficial effect material, an adjuvant, a compatibilizer, also comprises a preservative as described herein and propylene glycol.

Preferably, the aqueous suspension of the present invention comprising a beneficial effect material, an adjuvant, a compatibilizer, also comprises a dispersant, and a preservative as described herein and propylene glycol.

The aqueous suspensions of the invention exhibit stability against aggregation. Said stability can be characterized, e.g., in that the D90 value of the suspension does not increase by more than 5 times, in particular not by more than 4 times, more particularly not by more than 3 times, especially not by more than 2.5 times, when the suspension is stored for two weeks at 54° C.

The invention provides a process for preparing aqueous suspensions which are stable against aggregation, e.g. a stable aqueous suspension of the invention as described above. Said process (process alternative A) comprises the step:

(1) mixing an aqueous suspension of particles of at least one beneficial effect material with at least one compatibilizer to obtain a compatibilized beneficial effect material suspension;

(2) combining the compatibilized beneficial effect material suspension with at least one adjuvant to obtain an aqueous suspension.

The at least one beneficial effect material used in the process of the invention has a solubility in water at 25° C. of 5000 mg/l or less and can further be characterized as described herein for the aqueous suspensions of the invention.

The at least one compatibilizer and the at least one adjuvant used in the process of the invention are as defined herein for the aqueous suspensions of the invention.

According to preferred embodiments, the amount of the at least one adjuvant used in the process of the invention is in the range of from 10 to 60% by weight, in particular in the range of from 15 to 50% by weight, based on the total weight of the obtained suspension of the beneficial effect material.

Thus, according to preferred embodiments, the amount of the at least one adjuvant used in step (2) of the process of the invention as described above is in the range of from 10 to 60% by weight, in particular in the range of from 15 to 50% by weight, based on the total weight of the suspension obtained in step (2).

According to preferred embodiments, the amount of the at least one compatibilizer used in the process of the invention is in the range of from 2.0 to 12% by weight, preferably 2.5 to 10% by weight, preferably 5 to 10% by weight, or in the range of from 4.0 to 7.4% by weight, based on the total weight of the obtained suspension of the beneficial effect material.

Thus, according to preferred embodiments, the amount of the at least one compatibilizer used in step (1) of the process of the invention is in the range of from 2.0 to 12% by weight, preferably 2.5 to 10% by weight, preferably 5 to 10% by weight, or in the range of from 4.0 to 7.4% by weight, based on the total weight of the suspension obtained in step (2).

The aqueous beneficial effect material suspension used in the process of the invention, in particular as used in step (1) of the process of the invention described above, can be prepared as generally known in the art. For example, the ingredients of said aqueous beneficial effect material suspension can be ground in a suitable device, such as e.g. a bead mill, until a suspension is obtained wherein (suitably sized) particles of the at least one beneficial effect material are dispersed. The dispersed beneficial effect material particles in the aqueous suspension used in the process of the invention, in particular as used in step (1) of the process of the invention described above, are typically characterized in terms of their size distribution by a D90 value of 25 µm or less, in particular the D90 value of said beneficial effect material particles is in the range of from 2.5 to 20 µm, more particularly in the range of from 2.7 to 15 µm, especially in the range of from 3.0 to 10 µm, preferably in the range of from 3.3 to 7 µm.

In particular, the steps of the process of the invention as described above involve mixing the constituents such that the resulting mixture appears homogeneous to the naked eye. In particular, steps (1) and (2) of the process of the invention as described above involve mixing the constituents (i.e. the aqueous beneficial effect material suspension and the at least one compatibilizer in step (1) or the compatibilized beneficial effect material suspension and the at least one adjuvant in step (2), respectively) such that the resulting mixture appears homogeneous to the naked eye. The order of adding the at least one compatibilizer before adding the at least one adjuvant is of major importance for obtaining the desired stable aqueous beneficial effect material suspensions. Hence, in one embodiment, the compatibilizer is added to the aqueous beneficial effect material suspension before the addition of adjuvants. In an alternative embodiment described below, which also reaches stable aqueous suspensions, the adjuvant is added to the compatibilizer solution before both are combined with the aqueous beneficial effect material suspension, preferably, wherein the aqueous beneficial effect material suspension is added to the compatibilized adjuvants. A reverse order of addition of compatibilizer and adjuvant will usually result in aggregation. The temperature during mixing and the further mixing conditions are of lesser importance. Usually, mixing of the constituents is carried out at temperatures of from 10° C. to 50° C., in particular from 10° C. to 40° C. or at ambient temperature.

The obtained aqueous suspension of the beneficial effect material typically comprises, based on its total weight, at least 20% by weight of water.

Preferably, the aqueous suspension obtained in step (2) process of the invention described above typically comprises, based on its total weight, at least 20% by weight of water. Basically all (e.g., at least 95%, at least 97% or at least 99%) of the water is comprised in the compatibilized beneficial effect material suspension obtained in step (1) of the process of the invention, wherein most of the water (e.g., at least 60% or at least 70%) thereof, is typically comprised in the aqueous beneficial effect material suspension before addition of the at least compatibilizer.

For process alternative A, the auxiliaries are typically incorporated in the aqueous suspension before the at least one compatibilizer is added. This applies particularly to dispersants, anti-foaming agents, crystallization inhibitors and thickeners.

Alternatively (process alternative B), said process comprises the steps:
(1) adding to a solution of at least one compatibilizer at least one adjuvant;
(2) combining the compatibilized adjuvant solution with an aqueous suspension of particles of at least one beneficial effect material, preferably also comprising a dispersant and/or an anti-foam, to obtain an aqueous suspension.

For process alternative B, typical other auxiliaries like anti-freeze, biocide and if necessary crystal growth inhibitor are typically incorporated in the adjuvant-compatibilizer mixture before adding it to the milled aqueous pesticide suspension concentrate. Finally, thickener is added to adjust the desired viscosity.

The sum of the least one beneficial effect material, the at least one adjuvant, the at least one compatibilizer and the water comprised in the aqueous suspension prepared by the process of the invention typically makes up at least 85% by weight, in particular 90% by weight, preferably 95% by weight, of the total weight of said aqueous suspension.

The aqueous suspension prepared by the process of the invention can further include auxiliaries such as e.g., dispersants, anti-foaming agents, viscosity-modifying additives (thickeners), crystallization inhibitors, preservatives (e.g., bactericides), colorants and/or anti-freezing agents as described hereinabove. Said auxiliaries can be incorporated in the aqueous beneficial effect material suspension before the at least one compatibilizer is added. This applies particularly to dispersants, anti-foaming agents, crystallization inhibitors and thickeners.

According to one group of embodiments, the obtained aqueous suspension of the beneficial effect material further comprises at least one dispersant, at least one anti-foaming agent and at least one thickener.

The nature and the amounts of the auxiliaries used in the process of the invention are as described hereinabove.

The present invention also provides a stable aqueous suspension obtainable by the process of the invention.

The invention also relates to uses of the stable aqueous pesticide-adjuvant suspension of the invention for controlling or combatting pests, for protecting plants (in particular crops) from pests. For this purpose, the suspension may be applied as such or is preferably applied after dilution with water. Unless indicated otherwise, the term "plant" as used herein in particular refers to whole plants but also includes plant parts, especially seeds and other propagation forms.

Preferably, for various purposes of end user application, an aqueous ready-to-use preparation (e.g. a so-called aqueous spray-liquor) is prepared by diluting the aqueous pesticide-adjuvant suspension of the present invention with water, e.g. tap water. The ready-to-use preparations may also comprise further constituents in dissolved, emulsified or suspended form, for example nutrificants such as mineral salts which are employed for alleviating nutritional and trace element deficiencies, fertilizers, pesticides other than that/those contained in the aqueous pesticide-adjuvant suspension, and nonphytotoxic oils or oil concentrates. As a rule, these constituents are added before, during or after dilution of the aqueous pesticide-adjuvant suspension of the invention. For example, such further constituents, in particular those selected from water soluble nutrificants, fertilizers, pesticides and mixtures thereof, may be comprised in the water that is used for diluting the aqueous pesticide-adjuvant suspension of the present invention.

Dilution will be usually achieved by pouring the aqueous pesticide-adjuvant suspension of the invention into water. Usually, dilution is achieved with agitation, e.g. with stirring, to ensure a rapid mixing of the aqueous pesticide-adjuvant suspension of the invention in water. However, agitation is generally not necessary. Though the temperature of mixing is not critical, mixing is usually performed at temperatures ranging from 0 to 50° C., in particular from 10 to 30° C. or at ambient temperature.

The invention also relates to aqueous ready-to-use preparations obtained by diluting the aqueous pesticide-adjuvant suspension of the invention with at least 5 parts of water, preferably at least 10 parts of water, in particular at least 20 parts of water and more preferably at least 50 parts of water, e.g. from 10 to 10,000, in particular from 20 to 1,000 and more preferably from 50 to 250 parts of water per one part of the aqueous pesticide-adjuvant suspension (all parts are given in parts by weight).

The application of the aqueous pesticide-adjuvant suspension of the invention, in particular in diluted form as aqueous ready-to-use preparation, can be carried out both before and after the infection of the to-be-protected materials or plants by the pests.

The aqueous pesticide-adjuvant suspension of the invention or aqueous ready-to-use preparation thereof can be applied in a conventional manner including in particular foliar application to (the leaves of) the plant to be protected from the pest or, when the pest is a weed, to the weed to be controlled and/or the plant to be protected therefrom. Typical modes of application include spraying. Suitable spraying techniques for such purposes are known to the person skilled in the art and include, e.g., spraying using water as carrier and amounts of ready-to-use preparation (spray liquor) of about 100 to 1,000 liters per hectare, for example from 300 to 400 liters per hectare.

The present invention further relates to method for controlling a pest or for protecting a plant (in particular a crop) from a pest, e.g. a pest selected from the group of fungi, weeds, insects, arachnids and nematodes, wherein said method comprises contacting the plant to be protected or the pest, its food supply, habitat, breeding grounds or locus with a pesticidally effective amount of an aqueous pesticide-adjuvant suspension of the invention comprising a suitable pesticide, in particular in diluted form of an aqueous ready-to-use preparation.

In general, "pesticidally effective amount" means the amount of the aqueous pesticide-adjuvant suspension or aqueous ready-to-use preparation needed to achieve an observable effect on the growth of a pest (including the effects of necrosis, death, retardation, prevention, and removal), an observable destruction of the pest, or an observable other reduction of the occurrence and/or activity of the pest. The pesticidally effective amount can vary depending on factors including, e.g., the amount of pesticide and the amount of adjuvant in the aqueous pesticide-adjuvant suspension, and the degree of dilution in the aqueous ready-to-use preparation. The pesticidally effective amount will also vary according to the prevailing conditions including, e.g., the desired pesticidal effect and duration, the weather, the targeted pest species, the locus of the pest, and the mode of application.

EXAMPLES

Method (I): Particle Size Analysis According to CIPAC MT 187

1.0 ml of the sample (suspension) was stirred into 9 ml of fully demineralized water using a magnetic stirrer. Specific amounts of this diluted sample were added to the Malvern Master Sizer Dispersing Unit (Hydro MV) until a laser shadowing of 15% (+/−3%) was reached. Within the dispersing unit, the sample was diluted in 120 ml of fully demineralized water and pumped through the measuring cell of the Malvern Mastersizer 3000 (Malvern Pananalytical GmbH, Germany) that used a 632.8 nm laser (4 mW He—Ne) for analysis. The sample and the fully demineralized water used for the dilution were at room temperature.

Particle size distribution, including D10, D50 and D90 values, was calculated using the Fraunhofer model as known in the art. See, e.g., ISO 13320-1:1999(E).

Method (II): Accelerated Storage Test According to CIPAC MT 46.3

About 50 ml of the sample (suspension) were placed in a 100 ml glass bottle fitted with screw cap and polyethylene inserts, and kept in an oven at the specified temperature (+/−2° C.) for the defined period of time. Then the bottle was removed from the oven and allowed to reach room temperature before further analysis.

Example a: Preparation of Suspension Concentrates

The ingredients of the suspension concentrates are summarized in Table 1 below.

Suspensions concentrates were prepared by grinding the ingredients of "part A" (see Table 1) in a bead mill with zirconium oxide grinding beads such that the dispersed pesticide particles reach a particle size distribution characterized by a D90 of ≤10 μm and a D50≤3 μm. Particles analysis was done according to method (I) above. Then the thus obtained pesticide suspension concentrate was mixed with the compatibilizer (see "part B" of Table 1). Finally, the adjuvant ("part C" of Table 1) was added.

TABLE 1

Composition of suspension concentrates

[% by weight] (relative to the total weight of the suspension concentrate)

| ingredients | Examples | | | | | | Reference Examples | | | |
| --- | --- | --- | --- | --- | --- | --- | --- | --- | --- | --- |
| | 1 | 2 | 3 | 4 | 5 | 6 | R1 | R2 | R3 | R4 |
| part A | | | | | | | | | | |
| water | 26.84 | 21.20 | 56.84 | 51.20 | 46.84 | 41.20 | 81.84 | 31.84 | 61.84 | 51.84 |
| azoxystrobin (pesticide) | 15.00 | 15.00 | 15.00 | 15.00 | 15.00 | 15.00 | 15.00 | 15.00 | 15.00 | 15.00 |
| Dispersant[2] | 2.50 | 2.50 | 2.50 | 2.50 | 2.50 | 2.50 | 2.50 | 2.50 | 2.50 | 2.50 |
| Agnique DFM (anti-foaming agent) | 0.30 | 0.30 | 0.30 | 0.30 | 0.30 | 0.30 | 0.30 | 0.30 | 0.30 | 0.30 |
| 2% by weight xanthan gum in water (thickener) | 0.36 | 0.36 | 0.36 | 0.36 | 0.36 | 0.36 | 0.36 | 0.36 | 0.36 | 0.36 |
| part B | | | | | | | | | | |
| hexanol-5EO[1] (compatibilizer) | 5.00 | — | 5.00 | — | 5.00 | — | — | — | — | — |
| 47% by weight sodium 2-ethylhexyl sulfate in water (compatibilizer) | — | 10.64 | — | 10.64 | — | 10.64 | — | — | — | — |
| part C | | | | | | | | | | |
| Adjuvant 1[3] | 50.00 | 50.00 | — | — | — | — | — | 50.00 | — | — |
| Adjuvant 2[3] | — | — | 20.00 | 20.00 | — | — | — | — | 20.00 | — |
| Adjuvant 5[3] | — | — | — | — | 30.00 | 30.00 | — | — | — | 30.00 |

[1] $C_6H_{13}$—O—$(CH_2$—$CH_2$—O$)_5$—H
[2] block copolymer, central with polypropylene glycol, flanked with two polyethylene glycol groups
[3] Adjuvants as described in Table A above Example B: Stability Assessment of Suspension Concentrates The stability of the suspension concentrates obtained in example A was assessed by performing a particle size distribution analysis so as to determine the D90, D50 and D10 values of the dispersed particles (see method (I) above). Storage stability was assessed as described in method (II) above.

B1) Effect of Adjuvant on the Stability of Pesticide Suspension Concentrates The effect of relatively high amounts of adjuvants was examined by comparing the pesticide suspension concentrate of reference example R1 with the pesticide-adjuvant suspension concentrates of reference examples R2, R3 and R4. To this end, the particle size distribution analysis of the suspension concentrates was performed after keeping the suspension concentrates (subsequent to their preparation) at room temperature for 24 h.

The pesticide suspension concentrate of reference example R1 was stable, i.e. the D10, D50 and D90 values remained the same over the 24 h storage period at room temperature. The addition of adjuvants rendered the pesticide suspension concentrate unstable, i.e. caused significant aggregation (see Table 2).

TABLE 2

Particle size distribution after 24 h at room temperature

|  | R1 | R2 | R3 | R4 |
|---|---|---|---|---|
| appearance | very low viscosity | medium viscosity | high viscosity | high viscosity |
| D10 [µm] | 0.53 | 0.87 | 0.78 | 1.09 |
| D50 [µm] | 1.23 | 2.93 | 2.40 | 6.12 |
| D90 [µm] | 2.80 | 61.50 | 30.60 | 38.10 |

B2) Effect of Compatibilizer on the Stability of Pesticide-Adjuvant Suspension Concentrates The effect of compatibilizer was examined by comparing the pesticide suspension concentrate of reference example R1 with the pesticide-adjuvant suspension concentrates of examples 1-6. To this end, the particle size distribution analysis of the suspension concentrates was performed after keeping the suspension concentrates (subsequent to their preparation) at 54° C. for 2 weeks. This type of incubation at elevated temperature is for faster aging so as to mimic a two-year storage at room temperature.

The pesticide suspension concentrate of reference example R1 remained stable, i.e. the D10, D50 and D90 values remained basically the same over the two-week storage period (data not shown). A comparison with the reference data in Table 2 shows that the addition of compatibilizer (hexanol-5EO or sodium 2-ethylhexyl sulfate) counteracted the adjuvant-induced aggregation (see Tables 3, 4 and 5). The adjuvants are as described in Table A above.

TABLE 3

Particle size distribution after 2 weeks at 54° C., adjuvant = Adjuvant 1[1)]

|  | Reference Examples | | Examples | |
|---|---|---|---|---|
|  | R1[#] | R2[#] | 1 | 2 |
| appearance | very low viscosity | medium viscosity | low viscosity | low viscosity |
| D10 [µm] | 0.53 | 0.87 | 0.74 | 0.76 |

TABLE 3-continued

Particle size distribution after 2 weeks at 54° C., adjuvant = Adjuvant 1[1)]

|  | Reference Examples | | Examples | |
|---|---|---|---|---|
|  | R1[#] | R2[#] | 1 | 2 |
| D50 [µm] | 1.23 | 2.93 | 2.09 | 2.18 |
| D90 [µm] | 2.80 | 61.50 | 4.48 | 5.86 |

[#]data copied from Table 2, reference examples kept for 24 h at room temperature
[1)]Adjuvants are as described in Table A above

TABLE 4

Particle size distribution after 2 weeks at 54° C., adjuvant = Adjuvant 2[1)]

|  | Reference Examples | | Examples | |
|---|---|---|---|---|
|  | R1[#] | R3[#] | 3 | 4 |
| appearance | very low viscosity | high viscosity | very low viscosity | very low viscosity |
| D10 [µm] | 0.53 | 0.78 | 0.76 | 0.63 |
| D50 [µm] | 1.23 | 2.40 | 1.98 | 1.36 |
| D90 [µm] | 2.80 | 30.60 | 5.63 | 3.55 |

[#]data copied from Table 2, reference examples kept for 24 h at room temperature
[1)]Adjuvants are as described in Table A above

TABLE 5

Particle size distribution after 2 weeks at 54° C., adjuvant = Adjuvant 5[1)]

|  | Reference Examples | | Examples | |
|---|---|---|---|---|
|  | R1[#] | R4[#] | 5 | 6 |
| appearance | very low viscosity | high viscosity | low to medium viscosity | low to medium viscosity |
| D10 [µm] | 0.53 | 1.09 | 0.69 | 0.65 |
| D50 [µm] | 1.23 | 6.12 | 2.10 | 1.51 |
| D90 [µm] | 2.80 | 38.10 | 4.96 | 5.50 |

[#]data copied from Table 2, reference examples kept for 24 h at room temperature
[1)]Adjuvants are as described in Table A above Example C: Preparation of Suspension Concentrates Suspensions concentrates were prepared by grinding 40-50% azoxystrobin, 2.5% dispersant (copolymer based on vinyl acetate with alcohol-EO), 0.3% anti-foam (Agnique DFM 111 S) in a disperser "DAS 200", Lau GmbH with glass balls (diameter: 2 or 3 mm) such that the dispersed pesticide particles reach a particle size distribution characterized by a D90 of ≤10 µm and a D50≤3 µm. Particles analysis was done according to method (III). The adjuvant was added to a solution of compatibilizer in water. After that the obtained pesticide suspension concentrate was added to the compatibilizer-adjuvant-mixture to get a concentration of 10% active at the end. Storage stability was assessed as described in method (IV).

When using compatibilizer according to the formula $R^6-O-(R^5-O)_p-SO_3^-M^+$ with R6=$C_{12}/C_{14}$ linear, R5 Et, p=1, M=Na, addition of propylene glycol to the solution of compatibilizer in water facilitated the workability of the compatibilizer.

For the preparation method used in this example, typical other auxiliaries like anti-freeze, biozide and if necessary crystal growth inhibitor are typically incorporated in the adjuvant-compatibilizer mixture before adding it to the milled aqueous pesticide suspension concentrate. Finally, thickener is added to adjust the desired viscosity.

Method (III): Particle Size Analysis According to CIPAC MT 187

1.0 ml of the sample (suspension) was stirred into 9 ml of fully demineralized water using a magnetic stirrer. Specific amounts of this diluted sample were added to the Malvern Master Sizer 3000 Dispersing Unit (Hydro MV) until a laser shadowing of 6 to 8% was reached. Within the dispersing unit, the sample was diluted in 120 ml of fully demineralized water and pumped through the measuring cell of the Malvern Mastersizer 3000 (Malvern Pananalytical GmbH, Germany) that used a 632.8 nm laser (4 mW He—Ne) for analysis. The sample and the fully demineralized water used for the dilution were at room temperature.

Particle size distribution, including D50 and D90 values, was calculated using the Fraunhofer model as known in the art. See, e.g., ISO 13320-1:1999(E).

Method (IV): Accelerated Storage Test According to CIPAC MT 46.3

About 35 ml of the sample (suspension) were shared and placed in 40 ml glass bottles fitted with screw cap and polyethylene inserts, and kept in ovens at the specified temperatures (+/−2° C.) for the defined period of time. Then the bottle was removed from the oven and allowed to reach room temperature before further analysis.

The experimental result is shown in the following table (Table 6). The adjuvants and compatibilizers are abbreviated as shown above (cf. Table A and Table B, respectively).

TABLE 6

| w (adjuvant) [%] | compatibilizer | w (comp.) [%] | 2 weeks (w)/RT D90 [μm] | D50 [μm] | 2 w/−10 bis 40° C. D90 [μm] | D50 [μm] | 2 w/54° C. D90 [μm] | D50 [μm] |
|---|---|---|---|---|---|---|---|---|
| 20 | c | 7.5 | 2.89 | 1.46 | 4.25 | 1.84 | 4.52 | 1.8 |
| 30 | c | 7.5 | 3.84 | 1.86 | 4.68 | 2.08 | 4.49 | 1.97 |
| 30 | c plus propylene glycol (PG) (2:1) | 10 | 3.39 | 1.54 | 3.6 | 1.56 | 4.26 | 1.72 |
| 35 | c/PG = 2:1 | 10 | 3.39 | 1.55 | 3.42 | 1.54 | 4.01 | 1.68 |
| 40 | c/PG = 2:1 | 10 | 3.42 | 1.55 | 3.5 | 1.54 | 3.71 | 1.64 |
| 40 | c/PG = 2:1 | 10 | 3.19 | 1.47 | 3.18 | 1.48 | 4.67 | 1.7 |
| 30 | c | 10 | 3.45 | 1.56 | 4.06 | 1.58 | 3.95 | 1.59 |
| 30 | c | 10 | 3.17 | 1.47 | 3.21 | 1.49 | 4.01 | 1.59 |
| 35 | c | 10 | 3.4 | 1.56 | 3.45 | 1.55 | 3.38 | 1.57 |
| 40 | c | 10 | 3.18 | 1.46 | 3.2 | 1.48 | 3.53 | 1.58 |
| 30 | d | 10 | 4.34 | 1.79 | 3.93 | 1.75 | 3.97 | 1.75 |
| 20 | g | 7.5 | 3.56 | 1.56 | 3.52 | 1.54 | 3.52 | 1.56 |
| 20 | f | 5 | 3.22 | 1.58 | 3.85 | 1.85 | 4.4 | 2.15 |
| 20 | f | 6 | 5.31 | 1.9 | 3.89 | 1.9 | 3.42 | 1.69 |
| 30 | f | 6 | 4.02 | 1.76 | 3.5 | 1.72 | 5.08 | 2.19 |

Adjuvant: adjuvant 6, dispersant: copolymer based on vinyl acetate with alcohol-EO; d90 < 10 μm, d50 < 3 μm
Adjuvant and compatibilizer as identified above in Tables A and B, respectively

| w (adjuvant) [%] | compatibilizer | w (comp.) [%] | 2 w/RT D90 [μm] | D50 [μm] | 2 w/−10 bis 40° C. D90 [μm] | D50 [μm] | 2 w/54° C. D90 [μm] | D50 [μm] |
|---|---|---|---|---|---|---|---|---|
| 10 | c | 7.5 | 3.59 | 1.57 | 3.78 | 1.62 | 3.82 | 1.6 |
| 20 | c | 7.5 | 3.63 | 1.58 | 3.7 | 1.55 | 3.83 | 1.6 |
| 30 | c | 7.5 | 3.7 | 1.56 | 3.95 | 1.58 | 4.14 | 1.65 |

Adjuvant: adjuvant 7, dispersant: copolymer based on vinyl acetate with alcohol-EO; d90 ≤ 10 μm, d50 ≤ 3 μm
Adjuvant and compatibilizer as identified above in Tables A and B, respectively

| w (adjuvant) [%] | compatibilizer | w (comp.) [%] | 2 w/RT D90 [μm] | D50 [μm] | 2 w/−10 bis 40° C. D90 [μm] | D50 [μm] | 2 w/54° C. D90 [μm] | D50 [μm] |
|---|---|---|---|---|---|---|---|---|
| 20 | d | 5 | 3.94 | 1.66 | 3.95 | 1.65 | 4.93 | 1.82 |
| 20 | c | 5 | 3.90 | 1.64 | 3.98 | 1.64 | 4.40 | 1.77 |
| 20 | e | 5 | 3.93 | 1.64 | 3.93 | 1.64 | 4.25 | 1.77 |

Adjuvant: adjuvant 2, dispersant: copolymer based on vinyl acetate with alcohol-EO d90 < 10 μm, d50 < 3 μm
Adjuvant and compatibilizer as identified above in Tables A and B, respectively

| w (adjuvant) [%] | compatibilizer | w (comp.) [%] | 2 w/RT D90 [μm] | D50 [μm] | 2 w/−10 bis 40° C. D90 [μm] | D50 [μm] | 2 w/54° C. D90 [μm] | D50 [μm] |
|---|---|---|---|---|---|---|---|---|
| 20 | d | 5 | 5.32 | 2.29 | 5.73 | 2.64 | 4.95 | 2.08 |
| 20 | c | 5 | 5.59 | 2.29 | 6.13 | 2.68 | 5.84 | 2.41 |
| 20 | e | 5 | 6.48 | 2.55 | 6.53 | 2.89 | 6.79 | 2.71 |

Adjuvant: adjuvant 2, dispersant: Na salt of alkylnaphthalene sulfonate condensate; d90 < 10 μm, d50 < 3 μm
Adjuvant and compatibilizer as identified above in Tables A and B, respectively TABLE 6-continued Compatibilizers according to the formula $R^4—O—(CH_2—CH_2—O)_m—H$, wherein

| R4 | m |
|---|---|
| 2-Propylheptanol (C10-branched) | 5 |
| 2-Propylheptanol (C10-branched) | 8 | failed as compatibilizer (used amount 5-10%) using 20-40% adjuvant 6 (as identified above in Tables A). Here, no compatibilizer-adjuvant solution was obtained, but there was a phase separation. Consequently, no SC comprising active ingredient, compatibilizer and adjuvant could be prepared and no particle size could be measured.

The invention claimed is:

1. A stable aqueous suspension comprising:
   (i) dispersed particles of at least one beneficial effect material, wherein the at least one beneficial effect material comprises at least one agrochemically active agent, wherein the dispersed particles have a particle size distribution characterized by D90 of 50 μm or less;
   (ii) from 10 to 60% by weight, based on the total weight of the suspension, of at least one adjuvant selected from the group consisting of compounds of formula $R^1—O—(R^2—O)_n—R^3$, wherein
   $R^1$ is $C_8$-$C_{22}$-alkyl or $C_8$-$C_{22}$-alkenyl,
   each $R^2$ is independently selected from the group consisting of $C_2$-$C_5$-alkylene radicals, with the proviso that at least one $R^2$ is other than a $C_2$-alkylene radical when $R^1$ is $C_9$-$C_{15}$-alkyl or $C_9$-$C_{15}$-alkenyl;
   n is an integer of from 1 to 35, and
   $R^3$ is H or $C_1$-$C_5$-alkyl,
   and mixtures of such compounds; and
   (iii) at least one compatibilizer selected from the group consisting of:
   (a) ether compounds of formula $R^4—O—(CH_2—CH_2—O)_m—H$, wherein
   $R^4$ is $C_6$-$C_8$-alkyl,
   m is an integer of from 1 to 15,
   and mixtures of such ether compounds;
   (b) sulfated compounds of formula $R^6—O—(R^5—O)_p—S(O)_2—O^-M^+$, wherein
   $R^5$ is independently selected from the group consisting of $C_2$-$C_5$-alkylene radicals,
   p is an integer of from 0 to 15,
   $R^6$ is $C_6$-$C_{14}$-alkyl, and
   $M^+$ is an alkali ion or ammonium ion,
   and mixtures of such sulfated compounds; and
   (c) mixtures of at least one ether compound as defined in (a) and at least one sulfated compound as defined in (b).

2. The aqueous suspension of claim 1, wherein the aqueous suspension further comprises a preservative and an anti-freezing agent.

3. The aqueous suspension of claim 1, wherein the at least one adjuvant is selected from the group consisting of compounds of formula $R^1—O—(R^2—O)_n—R^3$, wherein
   $R^1$ is $C_8$-$C_{18}$-alkyl or $C_8$-$C_{18}$-alkenyl;
   each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
   n is an integer of from 6-20, and
   $R^3$ is H or $C_1$-$C_4$-alkyl,
   and mixtures of such compounds; and
   wherein the at least one compatibilizer selected from the group consisting of:
   (a) ether compounds of formula $R^4—O—(CH_2—CH_2—O)_m—H$, wherein
   $R^4$ is $C_6$-$C_8$-alkyl,
   m is an integer of from 4-10,
   and mixtures of such ether compounds;
   (b) sulfated compounds of formula $R^6—O—(R^5—O)_p—S(O)_2—O^-M^+$, wherein
   $R^5$ is independently selected from the group consisting of $C_2$-$C_5$-alkylene radicals,
   p is an integer of from 0 to 5,
   $R^6$ is $C_8$-$C_{14}$-alkyl, and
   $M^+$ is an alkali ion or ammonium ion,
   and mixtures of such sulfated compound; and
   (c) mixtures of at least one ether compound as defined in (a) and at least one sulfated compound as defined in (b).

4. The aqueous suspension of claim 1, wherein the aqueous suspension comprises a dispersant.

5. The aqueous suspension of claim 1, wherein the aqueous suspension further comprises propylene glycol.

6. The aqueous suspension of claim 1, wherein the at least one beneficial effect material further comprises at least one beneficial effect material selected from the group consisting of pharmaceutically active agents and cosmetic agents.

7. The aqueous suspension of claim 1, wherein the at least one adjuvant is selected from the group consisting of compounds of formula $R^1—O—(R^2—O)_n—R^3$,
   wherein
   $R^1$ is $C_{15}$-$C_{19}$-alkyl or $C_{15}$-$C_{19}$-alkenyl,
   each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
   n is an integer of from 16 to 20, and
   $R^3$ is H or butyl; or
   wherein
   $R^1$ is $C_7$-$C_9$-alkyl or $C_7$-$C_9$-alkenyl,
   each $R^2$ is independently selected from the group consisting of $C_2$-$C_4$-alkylene radicals, with the proviso that at least one $R^2$ is other than a $C_2$-alkylene radical when $R^1$ is $C_9$-$C_{15}$-alkyl or $C_9$-$C_{15}$-alkenyl;
   n is an integer of from 13 to 15, and
   $R^3$ is H;
   and mixtures of such compounds.

8. The aqueous suspension of claim 1, wherein the at least one adjuvant is selected from the group consisting of compounds of formula $R^1—O—(R^2—O)_n—R^3$, wherein
   (a) $R^1$ is straight or branched $C_8$-$C_{15}$-alkyl, each $R^2$ is independently selected from the group consisting of $C_2$-$C_5$-alkylene radicals, with the proviso that at least one $R^2$ is other than a $C_2$-alkylene radical, n is an integer of from 1 to 25, and $R^3$ is H, or
   (b) $R^1$ is straight or branched $C_{16}$-$C_{22}$-alkyl or straight or branched $C_{16}$-$C_{22}$-alkenyl, $R^2$ and n are as defined in claim 1, and $R^3$ is $C_1$-$C_5$-alkyl,
   and mixtures of such compounds.

9. The aqueous suspension of claim 1, wherein the at least one adjuvant is selected from the group consisting of compounds of formula $R^1$—O—$(R^2$—O$)_n$—$R^3$, wherein
- (a1) $R^1$ straight or branched $C_8$-$C_{15}$-alkyl, $(R^2$—O), is a polymeric group of 1-10 ethylene oxide radicals and 1-5 butylene oxide radicals, and $R^3$ is H, or
- (a2) $R^1$ straight or branched $C_8$-$C_{15}$-alkyl, $(R^2$—O$)_n$ is a polymeric group of 1-10 ethylene oxide radicals and 1-10 propylene oxide radicals, and $R^3$ is H, or
- (a3) $R^1$ is straight or branched $C_{16}$-$C_{18}$-alkyl or straight or branched $C_{16}$-$C_{18}$-alkenyl, $(R^2$—O$)_n$ is a polymeric group of 1-25 ethylene oxide radicals, and $R^3$ is $C_1$-$C_4$-alkyl, and mixtures of such compounds.

10. The aqueous suspension of claim 1, comprising, based on the total weight, from 2.0 to 12% by weight of the at least one compatibilizer.

11. The aqueous suspension of claim 1, wherein the at least one compatibilizer is selected from the group consisting of:
- (a) ether compounds of formula $R^4$—O—$(CH_2$—$CH_2$—O$)_m$—H, wherein
  $R^4$ is $C_6$-$C_7$-alkyl, and
  m is an integer of from 1 to 10,
  and mixtures of such ether compounds;
- (b) sulfated compounds of formula $R^6$—O—$(R^5$—O$)_p$—S(O)$_2$—O-M$^+$, wherein
  $R^5$ is independently selected from the group consisting of ethylene, propylene and butylene,
  p is an integer of from 0 to 10,
  $R^6$ is straight or branched $C_7$-$C_9$-alkyl, and
  M$^+$ is an alkali ion or ammonium ion,
  and mixtures of such sulfated compounds; and
- (c) mixtures of at least one ether compound as defined in (a) and at least one sulfate compound as defined in (b).

12. The aqueous suspension of claim 1, wherein the at least one compatibilizer is selected from the group consisting of:
sulfated compounds of formula $R^6$—O—$(R^5$—O$)_p$—S(O)$_2$—O-M$^+$, wherein
$R^5$ is independently selected from the group consisting of ethylene, propylene and butylene,
p is an integer of from 0 to 4,
$R^6$ is straight $C_7$-$C_{15}$-alkyl, and
M$^+$ is an alkali ion or ammonium ion,
and mixtures of such sulfated compounds.

13. The aqueous suspension of claim 1, wherein the at least one compatibilizer is selected from the group consisting of:
- (a) $C_6H_{13}$—O—$(CH_2$—$CH_2$—O$)_5$—H,
- (b) sodium 2-ethyl hexyl sulfate or ammonium 2-ethyl hexyl sulfate, and
- (c) mixtures of (a) and (b).

14. The aqueous suspension of claim 1, wherein the amount of the at least one beneficial effect material is from 5 to 30% by weight, based on the total weight of the aqueous suspension.

15. The aqueous suspension of claim 2, wherein the agrochemically active agent is a pesticide.

16. The aqueous suspension of claim 15, wherein the pesticide is selected from the group consisting of strobilurin fungicides and mixtures thereof.

17. The aqueous suspension of claim 16, wherein the pesticide is selected from the group consisting of azoxystrobin, fluoxastrobin, trifloxystrobin, kresoxim methyl, picoxystrobin, and mixtures thereof.

18. The aqueous suspension of claim 1, comprising, based on its total weight, at least 20% by weight of water.

19. The aqueous suspension of claim 1, wherein the sum of the at least one beneficial effect material, the at least one adjuvant, the at least one compatibilizer and the water comprised in the aqueous suspension makes up at least 85% by weight of the total weight of the aqueous suspension.

20. A process for preparing a stable aqueous suspension, the process comprising the steps:
(A)
- (1) mixing an aqueous suspension of particles of at least one beneficial effect material with at least one compatibilizer to obtain a compatibilized beneficial effect material suspension, wherein the at least one beneficial effect material comprises at least one agrochemically active agent; and
- (2) combining the compatibilized beneficial effect material suspension with at least one adjuvant to obtain an aqueous suspension; or (B)
- (1) adding to a solution of at least one compatibilizer at least one adjuvant; and
- (2) combining the compatibilized adjuvant solution with an aqueous suspension of particles of at least one beneficial effect material to obtain an aqueous suspension;

wherein the at least one compatibilizer is selected from the group consisting of:
- (a) ether compounds of formula $R^4$—O—$(CH_2$—$CH_2$—O$)_m$—H, wherein
  $R^4$ is $C_6$-$C_8$-alkyl,
  m is an integer of from 1 to 15,
  and mixtures of such ether compounds;
- (b) sulfated compounds of formula $R^6$—O—$(R^5$—O$)_p$—S(O)$_2$—O$^-$M$^+$, wherein
  $R^5$ is independently selected from the group consisting of $C_2$-$C_5$-alkylene radicals,
  p is an integer of from 0 to 15,
  $R^6$ is $C_6$-$C_{14}$-alkyl, and
  M$^+$ is an alkali ion or ammonium ion,
  and mixtures of such sulfated compounds; and
- (c) mixtures of at least one ether compound as defined in (a) and at least one sulfated compound as defined in (b); and wherein the at least one adjuvant is selected from the group consisting of compounds of formula $R^1$—O—$(R^2$—O$)_n$—$R^3$, wherein
$R^1$ is $C_8$-$C_{22}$-alkyl or $C_8$-$C_{22}$-alkenyl,
each $R^2$ is independently selected from the group consisting of $C_2$-$C_5$-alkylene radicals, with the proviso that at least one $R^2$ is other than a $C_2$-alkylene radical when $R^1$ is $C_9$-$C_{15}$-alkyl or $C_9$-$C_{15}$-alkenyl;
n is an integer of from 1 to 35, and
$R^3$ is H or $C_1$-$C_5$-alkyl,
and mixtures of such compounds.

21. The process of claim 20, wherein the amount of the at least one adjuvant used is from 10 to 60% by weight, based on the total weight of the obtained aqueous suspension of the beneficial effect material.

22. The process of claim 20, wherein the amount of the at least one beneficial effect material is from 5 to 30% by weight, based on the total weight of the obtained aqueous suspension of the beneficial effect material.

23. The process of claim 20, wherein the obtained aqueous suspension obtained in of the beneficial effect material comprises, based on its total weight, at least 20% by weight of water.

24. The process of claim 20, wherein the sum of the at least one beneficial effect material, the at least one adjuvant, the at least one compatibilizer and the water comprised in the obtained aqueous suspension of the beneficial effect material makes up at least 85% by weight of the total weight of the aqueous suspension.

25. A stable aqueous pesticide-adjuvant suspension obtained by the process of claim 20.

\* \* \* \* \*